US012776532B2

(12) United States Patent
Gattu et al.

(10) Patent No.: US 12,776,532 B2
(45) Date of Patent: Oct. 27, 2026

(54) HEAT PIPE FOR A BATTERY PACK

(71) Applicant: NISSAN NORTH AMERICA, INC., Franklin, TN (US)

(72) Inventors: Bharat Gattu, Farmington, MI (US); Sandeep Patil, Farmington Hills, MI (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 98 days.

(21) Appl. No.: 18/797,426

(22) Filed: Aug. 7, 2024

(65) Prior Publication Data

US 2026/0045580 A1 Feb. 12, 2026

(51) Int. Cl.
*H01M 10/6552* (2014.01)
*F28D 15/04* (2006.01)

(52) U.S. Cl.
CPC ...... *H01M 10/6552* (2015.04); *F28D 15/046* (2013.01)

(58) Field of Classification Search
CPC ............... F28D 15/046; F28D 15/0275; F28D 15/0233; H01M 10/6552; B60H 1/00278
See application file for complete search history.

(56) References Cited

U.S. PATENT DOCUMENTS 4,578,324 A * 3/1986 Koehler ............ H01M 10/6567 429/513
6,010,800 A * 1/2000 Stadnick ............ H01M 10/613 429/178
6,220,337 B1 * 4/2001 Chen .................. F28D 15/0266 165/10
2013/0130074 A1 * 5/2013 Timmons ................ B60L 58/26 29/890.032
2013/0216888 A1 * 8/2013 Shimura ........... H01M 10/6551 429/120
2014/0363719 A1 * 12/2014 Kwak ................ H01M 10/625 429/120
2014/0371946 A1 * 12/2014 Kwak .............. H01M 10/6572 429/90
2015/0214585 A1 * 7/2015 Sun ..................... H01M 50/278 429/120

(Continued)

FOREIGN PATENT DOCUMENTS

CN 213339640 U 6/2021
JP 5759600 B1 8/2015

(Continued)

*Primary Examiner* — Travis Ruby
(74) *Attorney, Agent, or Firm* — Spencer Fane, LLP

(57) ABSTRACT

A heat pipe is provided for a battery pack. The heat pipe includes a first sheet formed of a first metal and a second sheet formed of a second metal. A plurality of first wick structures are formed on a first surface of the first sheet, and a plurality of first channels are each formed between two of the plurality of first wick structures. A second surface of the second sheet faces the first surface of the first sheet. The heat pipe includes a heat transport media formed within each of the plurality of first channels. Each of the plurality of first wick structures is formed of a first wicking material configured to absorb and transport a fluid through capillary force. The first sheet and the second sheet are joined together at opposite ends such that the heat transport media is enclosed within the first sheet and the second sheet.

20 Claims, 16 Drawing Sheets

(56) References Cited

U.S. PATENT DOCUMENTS

| | | | | |
|---|---|---|---|---|
| 2016/0018166 | A1 | 1/2016 | Ahamed et al. | |
| 2016/0204488 | A1* | 7/2016 | Arai | B60H 1/00278 429/62 |
| 2016/0268655 | A1* | 9/2016 | Takamatsu | H01M 10/625 |
| 2018/0320985 | A1* | 11/2018 | Salim Shirazy | F28D 15/0233 |
| 2020/0136216 | A1* | 4/2020 | Dede | H01M 10/659 |
| 2020/0221605 | A1* | 7/2020 | Vanderwees | G06F 1/203 |
| 2020/0235445 | A1* | 7/2020 | Kamo | H01M 10/6552 |
| 2020/0287252 | A1* | 9/2020 | Li | H01M 10/6552 |
| 2021/0104793 | A1* | 4/2021 | Parkanzky | H01M 10/658 |
| 2021/0318072 | A1* | 10/2021 | Ito | H05K 7/20409 |
| 2021/0367288 | A1* | 11/2021 | Tong | H01M 10/6555 |
| 2022/0117116 | A1* | 4/2022 | Zhu | H01M 10/617 |
| 2022/0123388 | A1* | 4/2022 | Alexander | H01M 10/6554 |
| 2022/0243996 | A1* | 8/2022 | Gaigg | H01M 50/204 |
| 2022/0412663 | A1* | 12/2022 | Sevcenco | F28D 20/02 |
| 2023/0017153 | A1* | 1/2023 | Shaffer, II | H01M 10/0418 |
| 2023/0231221 | A1* | 7/2023 | Nicholas | H01M 10/6556 429/82 |
| 2023/0311630 | A1* | 10/2023 | Dunn | H01M 10/625 |
| 2023/0387491 | A1* | 11/2023 | Goldsberry | H01M 10/482 |
| 2023/0402676 | A1* | 12/2023 | Chang | H01M 10/6566 |
| 2024/0063456 | A1* | 2/2024 | Park | H01M 10/6555 |
| 2024/0140622 | A1* | 5/2024 | Freestone | F28D 15/0283 |
| 2024/0222737 | A1* | 7/2024 | Zhu | H01M 10/6552 |

FOREIGN PATENT DOCUMENTS

| | | | |
|---|---|---|---|
| JP | 2021131183 | A | 9/2021 |
| KR | 10-2019-0046526 | A | 5/2019 |

* cited by examiner

HEAT PIPE FOR A BATTERY PACK

BACKGROUND

Field of the Invention

The present invention generally relates to a heat pipe for a battery pack. The heat pipe includes a first sheet formed of a first metal and a second sheet formed of a second metal. A plurality of first wick structures are formed on a first surface of the first sheet, and a plurality of first channels are each formed between two of the plurality of first wick structures. A second surface of the second sheet faces the first surface of the first sheet. The heat pipe also includes a heat transport media formed within each of the plurality of first channels. Each of the plurality of first wick structures is formed of a first wicking material configured to absorb and transport a fluid through capillary force. The first sheet and the second sheet are joined together at opposite ends such that the heat transport media is enclosed within the first sheet and the second sheet. The present invention also relates to a battery pack including the heat pipe.

Background Information

Hybrid and electric vehicles typically include battery packs with lithium-based battery cells. Lithium-based batteries that include lithium metal anodes or lithium-based cathode material are desirable because they have a high energy density and, thus, can generate a large amount of power with a relatively thin electrode structure, thus permitting a reduction in the size of the battery as compared with other conventional batteries including anodes made of carbon or silicon.

However, when lithium-based batteries are used in a battery pack that includes cell modules with multiple unit cells, overheating of the battery pack can be a problem. Therefore, it is necessary to perform thermal management to control the temperature of the battery pack within a desirable range and avoid safety issues related to overheating when charging the battery pack or running a vehicle.

There are several known methods for thermal management of a battery pack in a vehicle. For example, it is known to cool battery packs using a water chiller or a liquid coolant. However, conventional cooling systems for battery packs cool primarily from the outer edges of the battery pack. Thus, there is a nonuniform temperature distribution among the battery pack, making it difficult to avoid thermal runaway especially near the inner portions of the cell modules where the electrode tabs are located.

Therefore, further improvement is needed to more uniformly control the temperature distribution throughout an entirety of the battery pack, in particular near the inner portion where the electrode tabs of the cell modules are located. In particular, it is desirable to provide a system for cooling the battery such that a more uniform temperature distribution can be achieved throughout an entirety of the battery pack.

SUMMARY

It has been discovered that a more uniform temperature distribution can be achieved in a battery pack by providing heat pipes between each of the unit cells. The heat pipes have unique wick structures with channels between each of the wick structures in the heat pipe. By providing such heat pipes between the unit cells, rather than at an outer edge of the battery pack, the heat pipes can absorb heat generated during battery charging or running of the vehicle throughout an entire area of the unit cells, thereby providing a more uniform temperature distribution throughout the battery pack. Furthermore, because heat pipes do not require any external power to operate, they are more energy efficient than conventional cooling systems.

In view of the state of the known technology, one aspect of the present disclosure is to provide a heat pipe for a battery pack. The heat pipe includes a first sheet formed of a first metal and a second sheet formed of a second metal. A plurality of first wick structures are formed on a first surface of the first sheet, and a plurality of first channels are each formed between two of the plurality of first wick structures. A second surface of the second sheet faces the first surface of the first sheet. The heat pipe also includes a heat transport media formed within each of the plurality of first channels. Each of the plurality of first wick structures is formed of a first wicking material configured to absorb and transport a fluid through capillary force. The first sheet and the second sheet are joined together at opposite ends such that the heat transport media is enclosed within the first sheet and the second sheet.

By providing such a heat pipe, a uniform temperature distribution can be obtained in the battery pack. In this regard, the heat absorbed in one area of the heat pipe heats the heat transport media within the enclosed heat pipe, forming a vapor that is then condensed into a liquid as the heat leaves another area of the heat pipe, and the liquid is returned to the first area. In this manner, the heat pipe can absorb heat in high-temperature areas, such as the inner portion of the battery pack, and can emit heat in low-temperature areas, such as the outer portion of the battery pack near the cooling system.

Another aspect of the present disclosure is to provide a battery pack. The battery pack includes a plurality of unit cells stacked in a stacking direction, and a heat pipe formed between a first unit cell and a second unit cell of the plurality of unit cells. The heat pipe includes a first sheet formed of a first metal and a second sheet formed of a second metal. A plurality of first wick structures are formed on a first surface of the first sheet, and a plurality of first channels are each formed between two of the plurality of first wick structures. A second surface of the second sheet faces the first surface of the first sheet. The heat pipe also includes a heat transport media formed within each of the plurality of first channels. Each of the plurality of first wick structures is formed of a first wicking material configured to absorb and transport a fluid through capillary force. The first sheet and the second sheet are joined together at opposite ends such that the heat transport media is enclosed within the first sheet and the second sheet first sheet formed of a first metal.

By providing an enclosed heat pipe between the unit cells, a uniform temperature distribution can be obtained in the battery pack. In this regard, the heat absorbed in an area of the heat pipe closest to the central, innermost portion of the cells heats the heat transport media within one end of the enclosed heat pipe, forming a vapor that is then condensed into a liquid as the heat leaves another end of the heat pipe, and the liquid is returned to the first area. In this manner, the heat pipe can absorb heat in high-temperature areas, such as the central portion of the cells, and can emit heat in low-temperature areas, such as the outer portion of the cells near the cooling system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
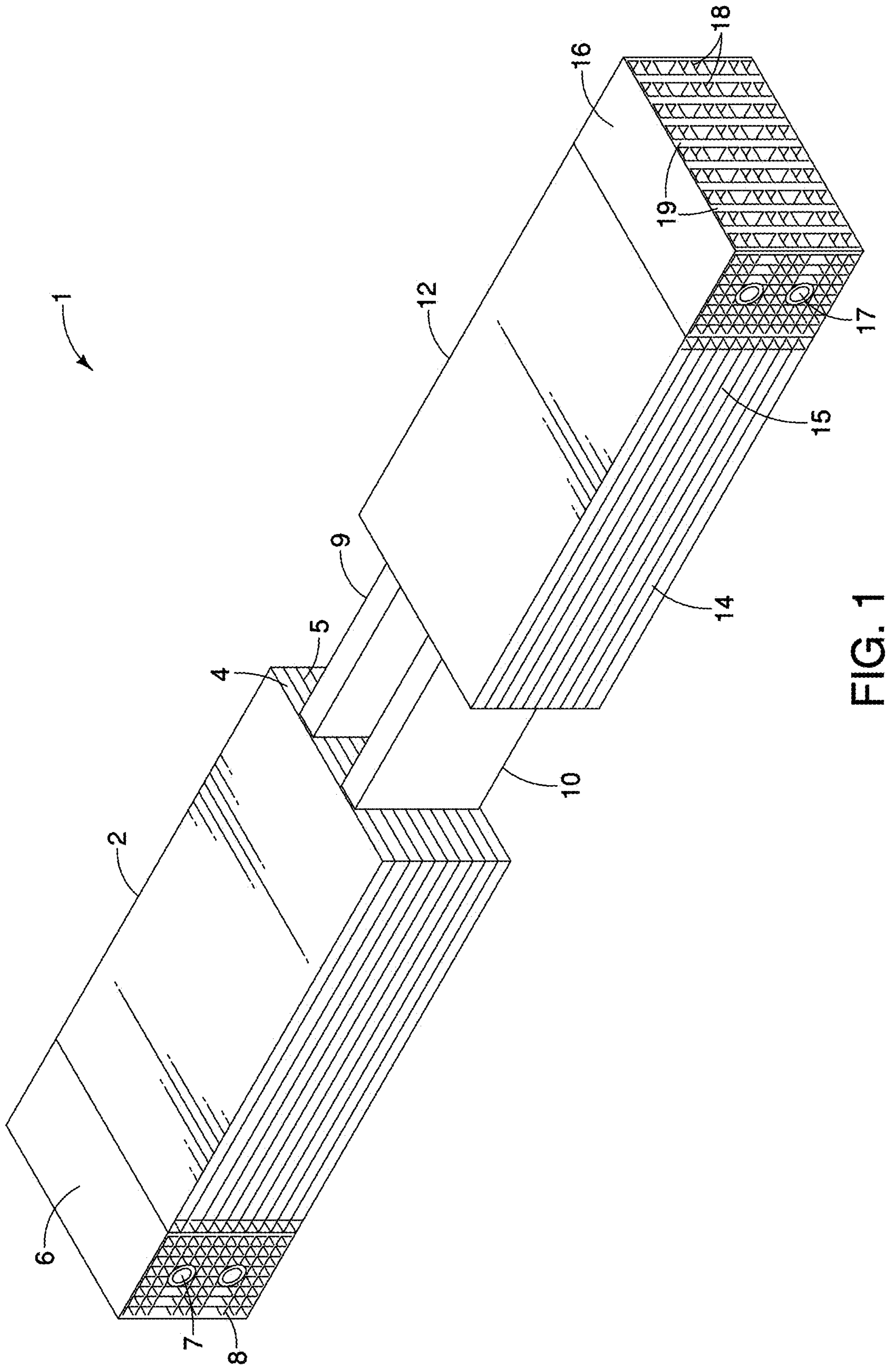
FIG. 1 is perspective view of a battery pack according to a first embodiment.

Referring initially to FIG. 1, a battery pack 1 is illustrated in accordance with a first embodiment. The battery pack 1 may be any suitable lithium-ion-based battery pack and can be used in a vehicle, an energy storage system, a laptop computer, a mobile device or other suitable personal electronic device. The battery pack 1 is preferably used in a hybrid vehicle or an electric vehicle.

As shown in FIG. 1, the battery pack 1 includes a first cell module 2. The first cell module 2 includes a plurality of unit cells 4 and heat pipes 5 provided between the unit cells 4. The unit cells 4 are any suitable batteries. For example, the unit cells 4 are each lithium-ion batteries. The heat pipes 5 have a total thickness of less than 3 mm. Although not shown, the heat pipes 5 have a larger area than the unit cells 4 such that an entirety of each of the unit cells 4 is in contact with at least one of the heat pipes 5. In this regard, the heat pipes 5 can efficiently absorb heat generated by the unit cells 4 during charging of the battery pack 1. For example, the heat pipes 5 can have an area of greater than 250 mm by 150 mm.

The heat pipes 5 have a planar sheet-like form as shown in FIG. 1. The heat pipes 5 can be formed of any suitable material. For example, the heat pipes 5 can be formed of two metallic layers each including at least one metal and/or alloy. Each of the metallic layers is preferably formed of copper, aluminum, an alloy of copper or aluminum, and combinations thereof. The two metallic layers are sealed or joined together at opposite ends thereof to form an enclosed structure. Although not shown, the heat pipes 5 internally, between the metallic layers, include a plurality of wick structures and channels formed between each of the wick structures as will be described in further detail below with respect to the embodiment in FIG. 5. The heat pipes 5 also include a heat transport media enclosed within the sealed ends of the two metallic layers.

The heat pipes 5 can also include outer coating layers (not shown) formed on each of the metallic layers and in contact with the unit cells 4. The outer coating layers can be formed of any suitable electronic insulator, thermal conductor, adhesive material, thermal propagation barrier, fire retarding material, or a combination thereof. A ratio of the thickness of each of the outer coating layers to the thickness of each of the metallic layers ranges from greater than 0.1 to less than 100. For example, the thickness of each of the outer coating layers is preferably greater than 5 μm and less than 2 mm.

The first cell module 2 further includes an outer edge portion 6 in which two cooling pipes 7 are provided. The outer edge portion 6 is a cooling portion that includes the cooling pipes 7, heat pipes 5 and cooling fins 8. The cooling pipes 7 pass through portions of the cooling fins 8. The cooling pipes 7 are formed of any suitable material configured to allow liquid coolant, such as water or ethylene glycol, to pass therethrough to cool the battery pack 1 and/or the first cell module 2. For example, the cooling pipes 17 can be formed of copper alloys, aluminum alloys, iron based alloys such as steel. The cooling fins 8 are formed using sealed ends of the metallic layers of the heat pipes 5 as will be described with reference to FIG. 5. In particular, the cooling fins 8 are formed by edge portions of the heat pipes 5 that extend into the outer edge portion 6. The edge portions of the heat pipes 5 do not include the wick structures and channels and instead are merely sealed edge portions of the metallic layers that form the heat pipes 5.

The battery pack 1 also includes positive electrode tabs 9, negative electrode tabs 10 and a second cell module 12. The electrode tabs 9 and 10 electrically connect the first cell module 2 to the second cell module 12.

The second cell module 12 includes a plurality of unit cells 14 and heat pipes 15 provided between the unit cells 14. The unit cells 14 are any suitable batteries. For example, the unit cells 14 are each lithium-ion batteries. The heat pipes 15 have a total thickness of less than 3 mm when an outer coating layer thickness is less than 0.5 mm or less than 5 mm when the outer coating layer thickness is greater than 0.5 mm. Although not shown, the heat pipes 15 have a larger area than the unit cells 14 such that an entirety of each of the unit cells 14 is in contact with at least one of the heat pipes 15. In this regard, the heat pipes 15 can efficiently absorb heat generated by the unit cells 14 during charging of the battery pack 1. For example, the heat pipes 15 can have an area of greater than 250 mm by 150 mm.

Figure 2A:
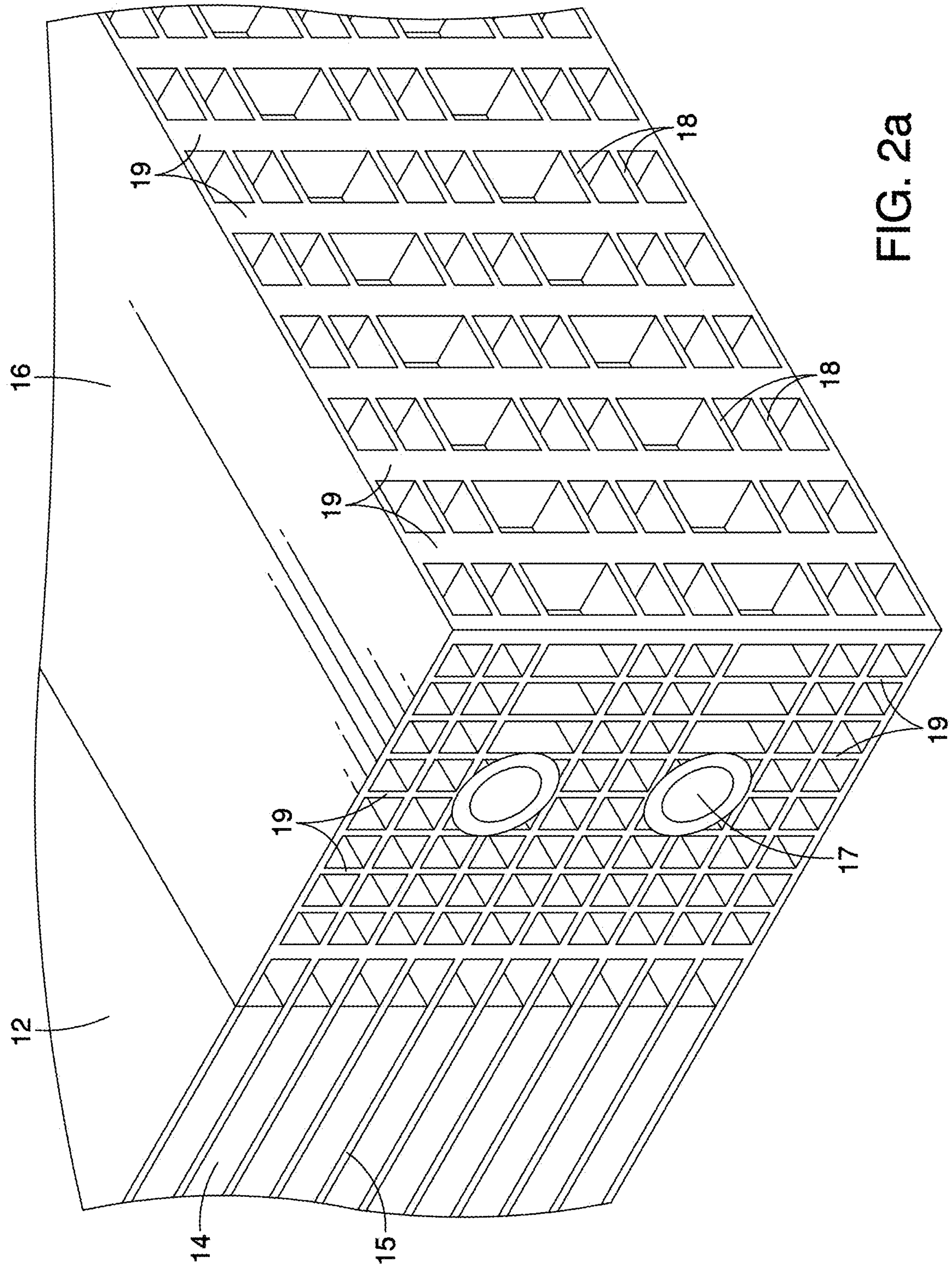
FIG. 2*a* is a partial enlarged view of the battery pack according to the first embodiment.
Figure 2B:
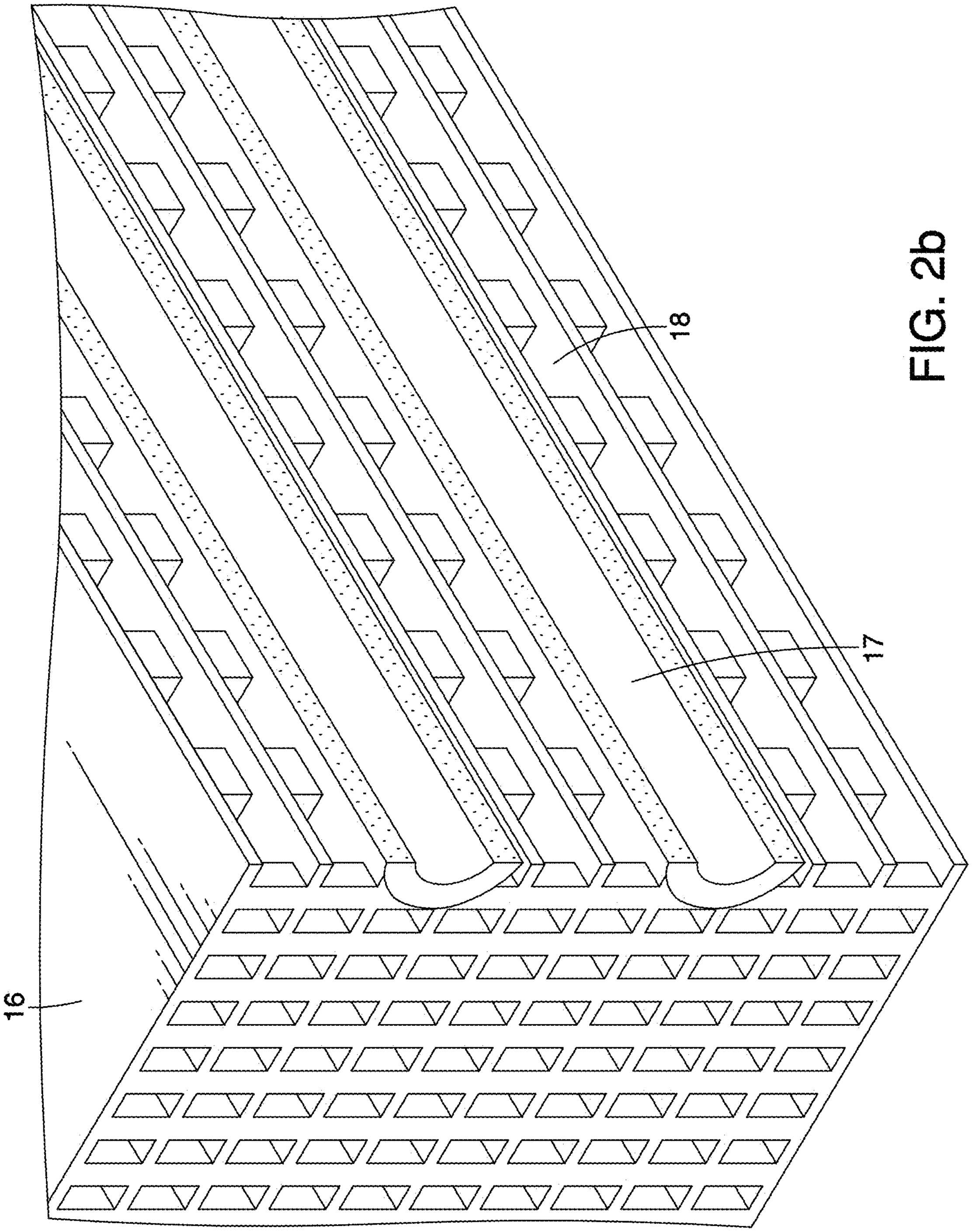
FIG. 2*b* is another partial enlarged view of the battery pack according to the first embodiment.

The heat pipes 15 have a planar sheet-like form as shown in FIGS. 1, 2*a* and 2*b*. The heat pipes 15 can be formed of any suitable material. For example, the heat pipes 15 can be formed of two metallic layers each including at least one metal and/or alloy. Each of the metallic layers is preferably formed of copper, aluminum, an alloy of copper or aluminum, and combinations thereof. The two metallic layers are sealed or joined together at opposite ends thereof to form an enclosed structure. Although not shown, the heat pipes 15 internally, between the metallic layers, include a plurality of wick structures and channels formed between each of the wick structures as will be described in further detail below with respect to the embodiment in FIG. 5. The heat pipes 15 also include a heat transport media enclosed within the sealed ends of the two metallic layers.

The heat pipes 15 can also include outer coating layers (not shown) formed on each of the metallic layers and in contact with the unit cells 14. The outer coating layers can be formed of any suitable electronic insulator, thermal conductor, adhesive material, thermal propagation barrier, fire retarding material or a combination thereof. A ratio of the thickness of each of the outer coating layers to the thickness of each of the metallic layers ranges from greater than 0.1 to less than 100. For example, the thickness of each of the outer coating layers is preferably greater than 5 μm and less than 2 mm. The heat pipes 15 have a total thickness of less than 3 mm when an outer coating layer thickness is less than 0.5 mm or less than 5 mm when the outer coating layer thickness is greater than 0.5 mm. This outer coating is applicable on either external surfaces of the heat pipe or can be present on only one external surface of the heat pipe. The outer coatings formed on the external surfaces can be dissimilar in composition and dimensions.

The second cell module 12 further includes an outer edge portion 16 in which two cooling pipes 17 are provided. The outer edge portion 16 is a cooling portion that includes the cooling pipes 17, heat pipes 15, horizontal cooling fins 18 and vertical cooling fins 19. The cooling pipes 17 pass through portions of the cooling fins 18, 19 as shown in FIGS. 2*a* and 2*b*. The cooling pipes 17 are formed of any suitable material configured to allow liquid coolant, such as water or ethylene glycol, to pass therethrough to cool the battery pack 1 and/or the second cell module 12. For example, the cooling pipes 17 can be formed of copper alloys, aluminum alloys, iron based alloys such as steel with high thermal conductivity.

FIGS. 2*a* and 2*b* show partial enlarged views of the second cell module 12 and the outer edge portion 16. As shown in FIG. 2*a*, the cooling fins 18 are formed by sealed ends of the metallic layers of the heat pipes 15 as will be described with reference to FIG. 5. In particular, the horizontal cooling fins 18 are formed by edge portions of the heat pipes 15 that extend into the outer edge portion 16. The edge portions of heat pipes 15 do not include the wick structures and channels and instead are merely sealed edge portions of the metallic layers that form the heat pipes 15. The outer edge portion 16 includes two cooling pipes 17 that pass through portions of the horizontal cooling fins 18. The cooling pipes 17 are formed in the outer edge portion 16 such that the cooling fins 18 that abut the cooling pipes 17 do not extend beyond the cooling pipes 17 as shown in FIGS. 2*a* and 2*b*. The vertical cooling fins 19 can be created with standard heat exchange assembly techniques.

In this embodiment, reference number 18 refers to cooling fins that are formed by sealed ends of the metallic layers of the heat pipes 15 and do not include the same internal structures as the heat pipes 15. However, it should be understood that in an alternative embodiment, the heat pipes 15 can extend throughout an entirety of the outer edge portion 16 such that parts 18 are merely an extension of the entirety of the respective heat pipes 15 rather than merely sealed metallic layers of the respective heat pipes 15.

Figure 8A:
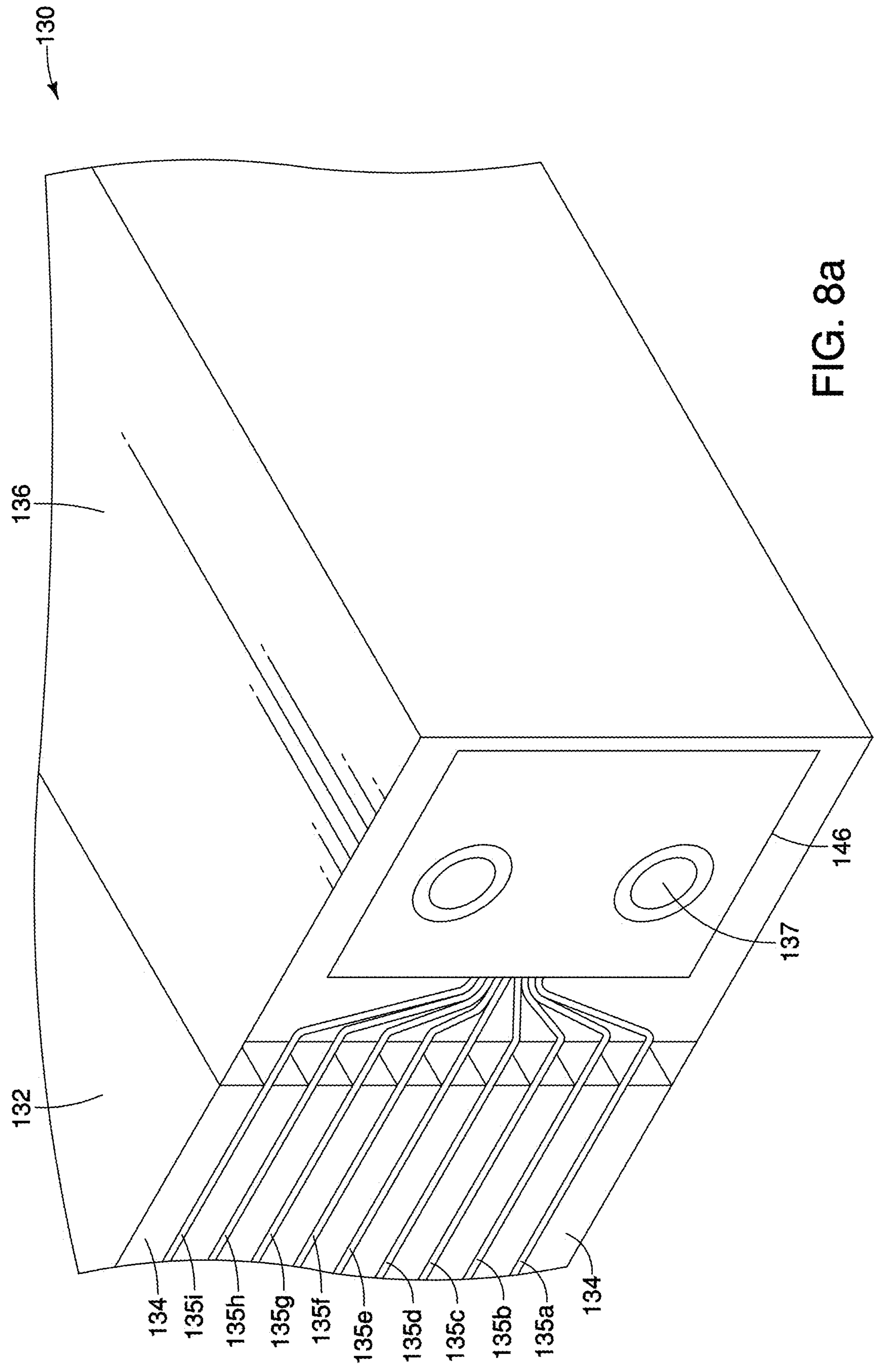
FIG. 8*a* is a partial enlarged view of a battery pack according to a seventh embodiment.
Figure 8B:
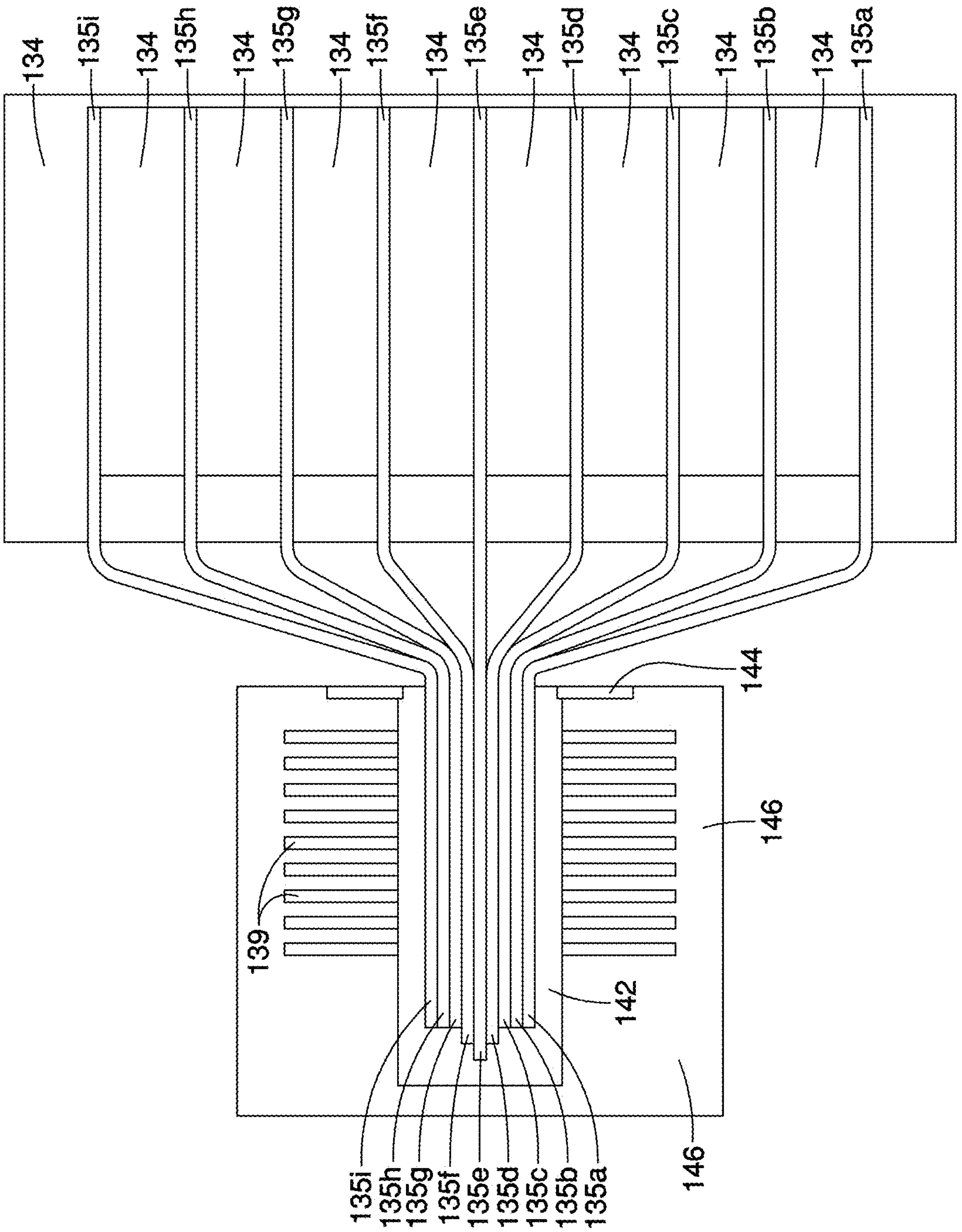
FIG. 8*b* is another partial cross-sectional view of the battery pack according to the seventh embodiment.

Furthermore, although FIG. 2*a* shows that each of the horizontal cooling fins 18 in the outer edge portion 16 extend substantially horizontally from the heat pipes 15 and each of the horizontal cooling fins 18 are separated by vertical cooling fins 19 in this embodiment, alternatively, it should be understood that cooling fins 18 in the outer edge portion 16 can form a stack of cooling fins 18 that extend from heath pipes 15 and are in direct contact with each other as explained in further detail below with respect to FIGS. 8*a* and 8*b*.

By providing the heat pipes 5, 15 between the unit cells 4, 14, the heat absorbed in an area of the heat pipes 5, 15 closest to the electrode tabs 9, 10 heats the heat transport media at one end of the enclosed heat pipes 5, 15, forming a vapor that is then condensed into a liquid as the heat leaves another end of the heat pipes 5, 15, and the liquid is returned to the first area. In this manner, the heat pipes 5, 15 absorb heat in high-temperature areas, such as the central portion of the battery pack 1 near the electrode tabs 9, 10, and emit heat in low-temperature areas, such as the outer portion of the cell modules 2, 12 near the cooling portions 6, 16, creating a more uniform temperature distribution in the battery pack 1.

Figure 3A:
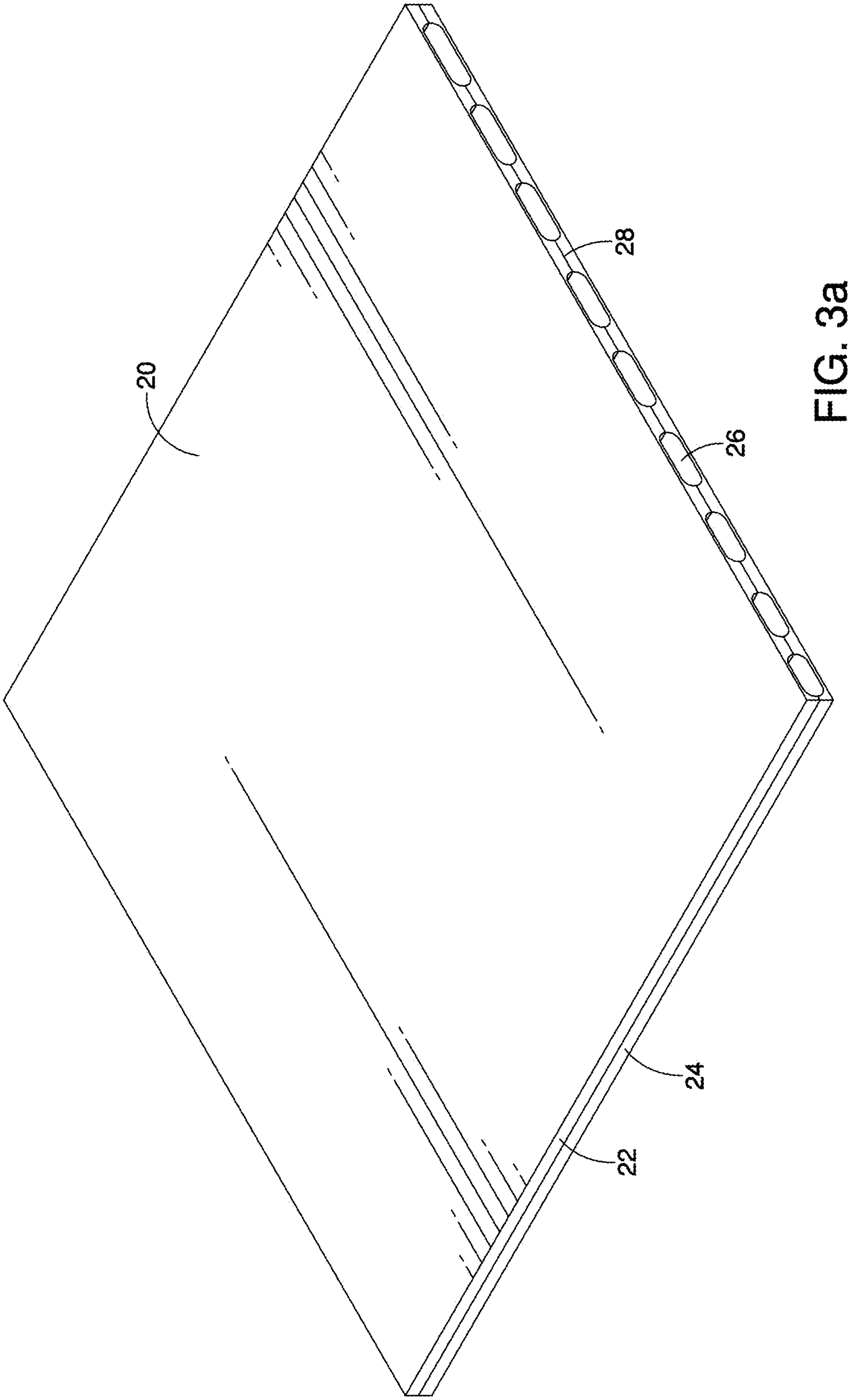
FIG. 3*a* is a partial perspective view of a heat pipe according to a second embodiment.

FIG. 3*a* shows a partial perspective view of a heat pipe 20 in accordance with a second embodiment. The heat pipe 20 has a planar sheet-like form and a total thickness of less than 3 mm. The heat pipe 20 is formed of a first sectional half 22 and a second sectional half 24 that each have a thickness of less than 1.5 mm. Although not particularly limited, the heat pipe 20 can have an area of greater than 250 mm by 150 mm. The heat pipe 20 also includes a plurality of channels 26 formed between wick structures 28.

The first sectional half 22 and the second sectional half 24 are identical and are joined together with their surfaces facing each other to form the heat pipe 20. For example, a bottom surface of the first sectional half 22 faces a top surface of the second sectional half 24. The first sectional half 22 and the second sectional half 24 are each formed of a metallic layer including at least one metal, such as copper, aluminum, an alloy of copper or aluminum, or a composite material having a thermal conductivity greater than 10 W/K/m. The metallic layer has a thickness greater than 5 μm and less than 1 mm. The first sectional half 22 and the second sectional half 24 are sealed together at opposite ends thereof (not shown).

The heat pipe 20 can also include outer coating layers (not shown) formed on an outer surface of the first sectional half 22 and the second sectional half 24. For example, the outer coating layer can be formed on the top surface of the first sectional half 22 and can be formed on the bottom surface of the second sectional half 24. The outer coating layers can be formed of any suitable electronic insulator, thermal conductor, adhesive material, thermal propagation barrier, fire retarding material or a combination thereof. A ratio of the thickness of each of the outer coating layers to the thickness of the metallic layer ranges from greater than 0.1 to less than 100. For example, the thickness of each coating layer is preferably greater than 5 μm and less than 2 mm. The heat pipes 20 have a total thickness of less than 3 mm when an outer coating layer thickness is less than 0.5 mm or less than 5 mm when the outer coating layer thickness is greater than 0.5 mm. This outer coating is applicable on either external surfaces of the heat pipe or can be present on only one external surface of the heat pipe. The outer coatings formed on the external surfaces can be dissimilar in composition and dimensions.

Figure 3B:
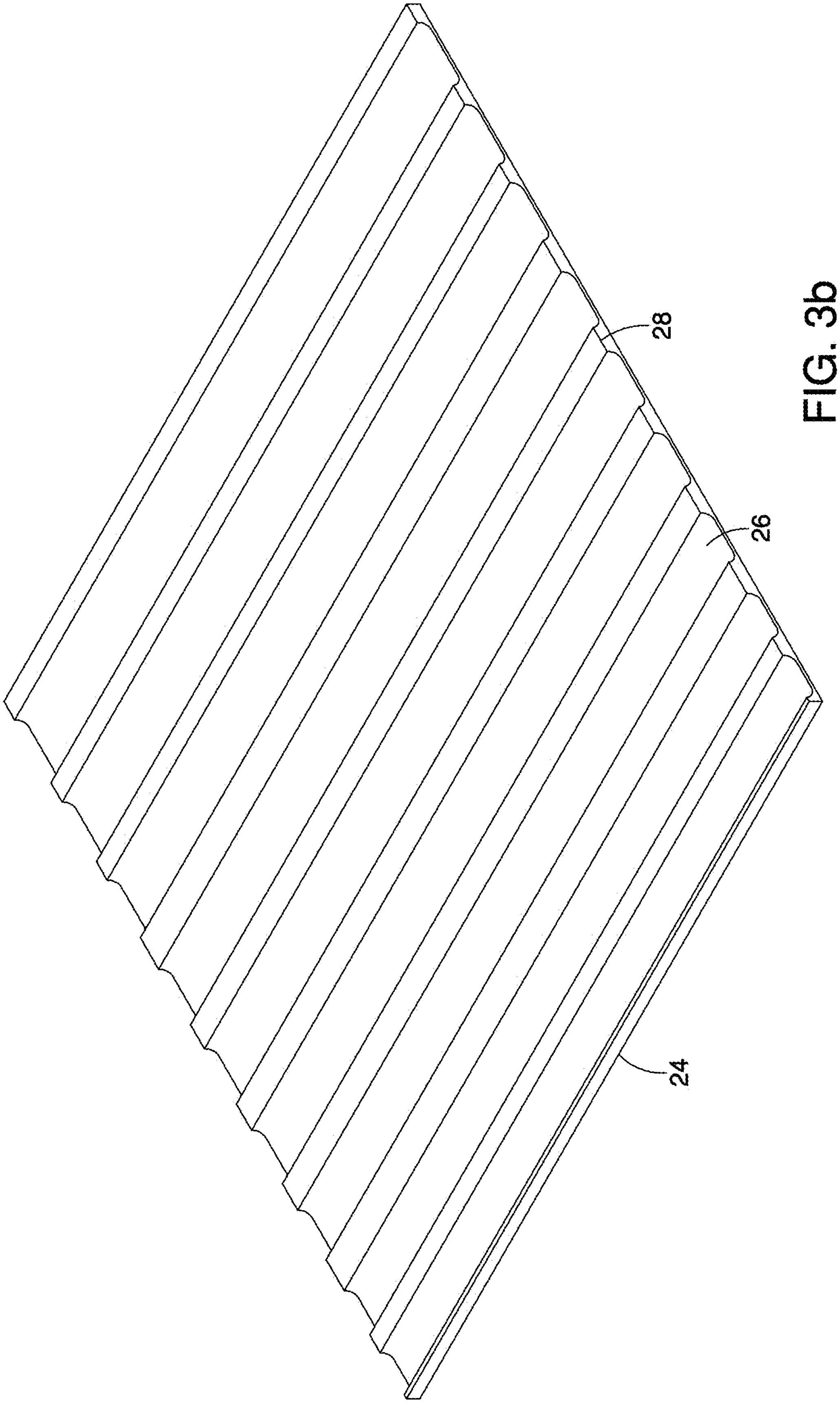
FIG. 3*b* is a partial perspective view of a bottom section of the heat pipe according to the second embodiment.

FIG. 3*b* shows a partial perspective view of the second sectional half 24. However, it should be understood that the first sectional half 22 and the second sectional half 24 are identical and therefore have the same configuration shown in FIG. 3*b*. Thus, a detailed description of the first sectional half 22 will be omitted for this embodiment. As shown in FIG. 3*b*, the second sectional half 24 includes a plurality of channels 26 and a plurality of wick structures 28.

The channels 26 are each formed between two adjacent wick structures 28 as shown in FIG. 3*b*. The channels 26 have a width of 25 μm to 4 mm and are configured to hold and transport the vapor formed by the heat transport media that is enclosed within the heat pipe 20. The wick structures 28 are each formed by a wicking material and hold the heat transport media in condensed or frozen state. The wick structures can have any suitable form, such as a powder, a sheet, a felt, a mat, a cloth, or a foam. The wicking material can be any suitable material configured to absorb and transport a fluid through capillary force. For example, the wicking material can be a copper alloy, an aluminum alloy, carbon, graphite, a ceramic material, diamond, or any combination thereof. The wicking material can be formed of a powder or particles having any suitable shape. For example, the powder or particles can be spherical, dendritic, rods, tubes or fibers. The powder or particles are held together by mechanical interlocking, a polymer binder, sintering, interface melting, or a combination of such mechanisms. The powder or particles can be surface modified to improve the capillary forces for the suction of working fluid(s) in the liquid state. The wick structures 28 each preferably have a width of approximately 25 μm to 4 mm and a thickness of less than 2 mm. However, the width of the wick structures 28 is not particularly limited, as long as a ratio of the width of the wick structures 28 to the width of the channels 26 is less than 10.

The heat pipe 20 also includes a heat transport media or working fluid (not shown) enclosed within the sealed ends of the metallic layers that form the first sectional half 22 and the second sectional half 24. The working fluid can be any suitable convective heat transport media existing in liquid-vapor-solid equilibrium inside the heat pipe. For example, the heat transport media includes any compound having the formula $C_aH_bE_c$, where $0 \le a \le 1$, $0 \le b \le 1$, $0 \le c \le 1$, and E is any element or combination of elements. For example, the heat transport media can be a working fluid such as water, a perfluorocarbon, a hydrofluorocarbon, a chlorofluorocarbon, ammonia, ethanol, propanol, butanol, ethylene carbonate, diethylene carbonate, dimethyl carbonate, dioxolane, dimethoxyethane, or a mixture of any of these working fluids.

In this embodiment, the first and second sectional halves 22, 24 have the same configuration and each include the channels 26 and wick structures 28. However, it should be understood that only one of the first and second sectional halves 22, 24 needs to include the channels 26 and wick structures 28. As such, it should be understood that one sectional half of the heat pipe 20 may be devoid of any channels 26 or wick structures 28.

Figure 4A:
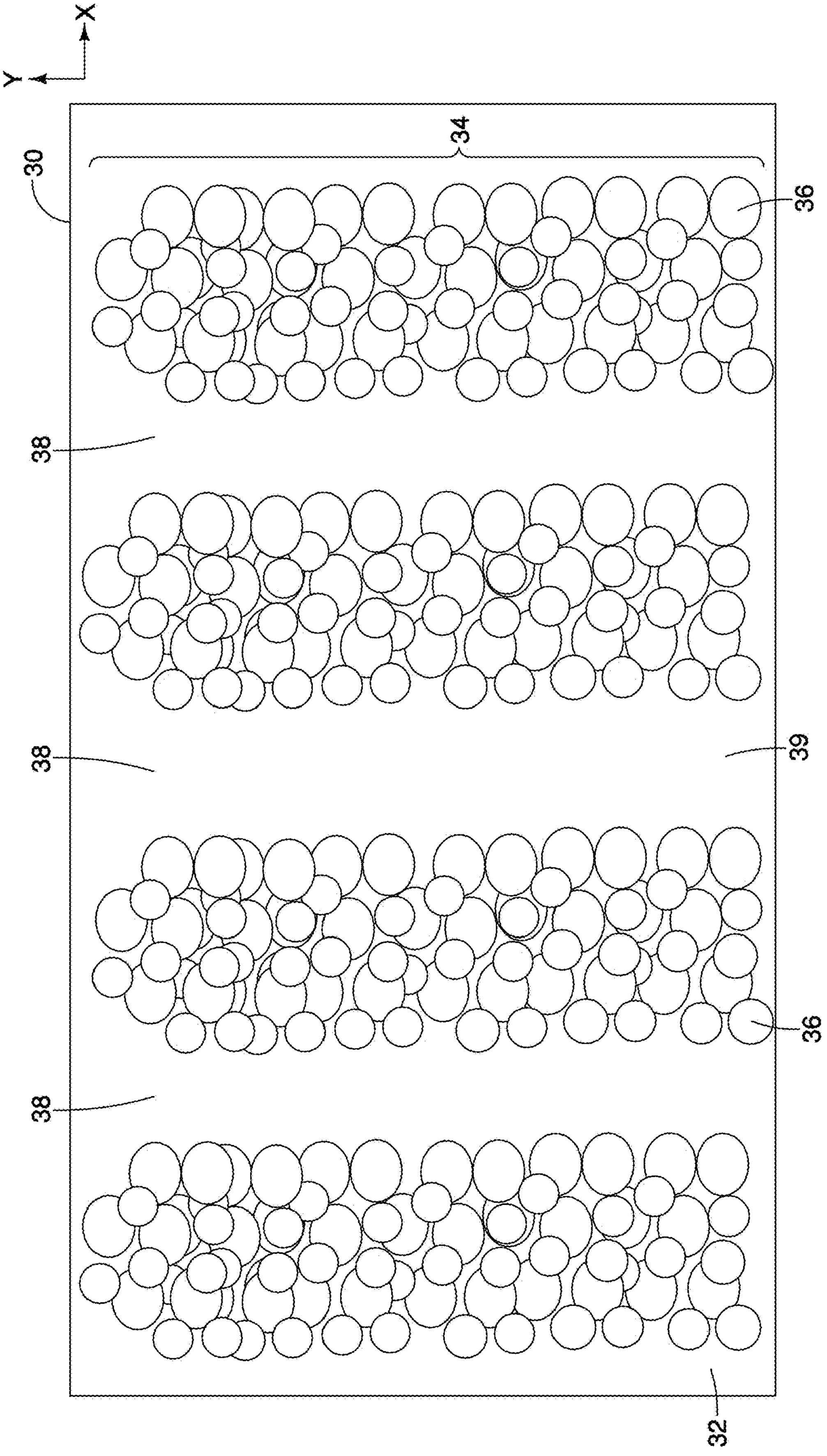
FIG. 4*a* is a top view of a section of a heat pipe according to a third embodiment.
Figure 4B:
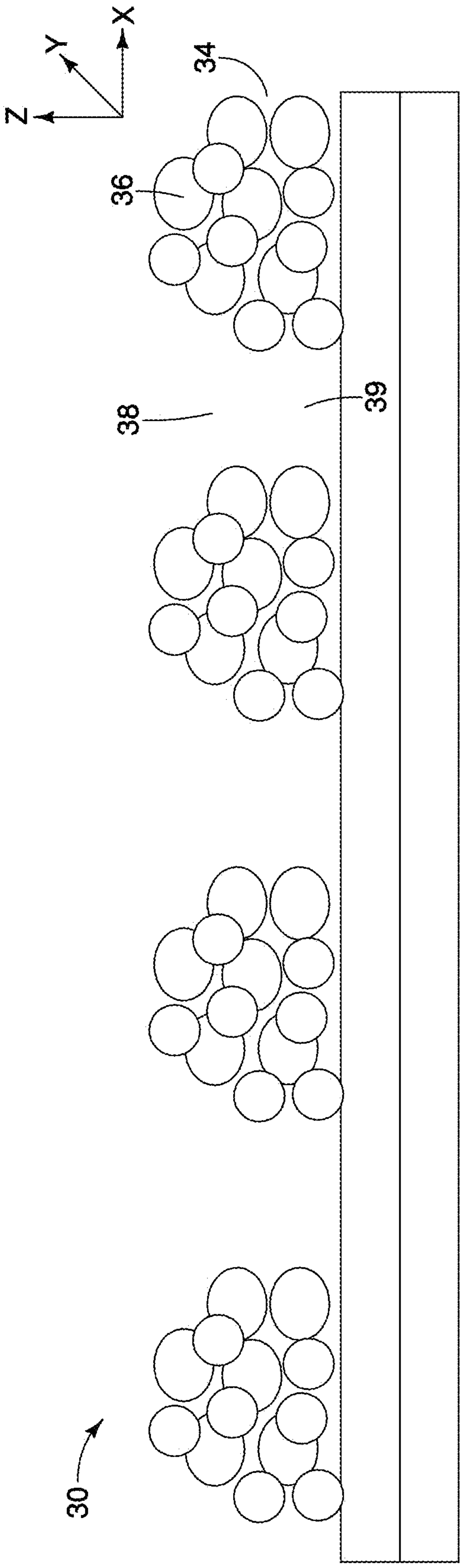
FIG. 4*b* is a first side view of the section according to the third embodiment.
Figure 4C:
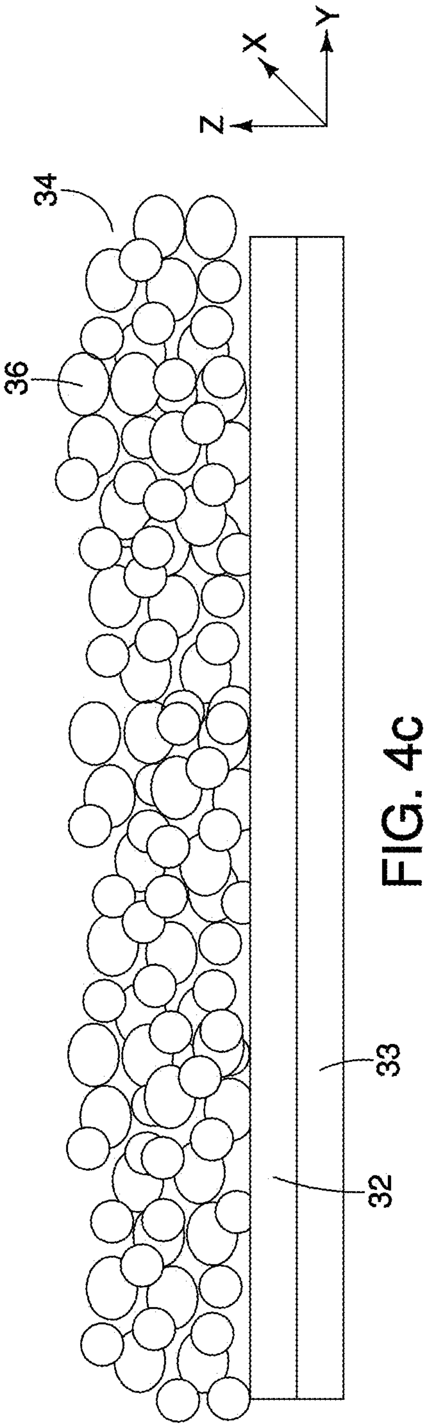
FIG. 4*c* is a second side view of the section according to the third embodiment.

FIGS. 4*a*-4*c* show various views of one section 30 of a heat pipe in accordance with a third embodiment. The section 30 is a sectional half of a heat pipe. The section 30 is formed of a planar sheet 32 and an outer coating layer 33. The sheet 32 has a thickness of greater than 5 μm and less than 1 mm. The sheet 32 is formed of at least one metal and/or alloy. For example, the sheet 32 can be formed of copper, aluminum, an alloy of copper or aluminum, or a composite material having a thermal conductivity greater than 10 W/K/m. The sheet 32 is preferably formed of copper or aluminum.

The outer coating layer 33 is formed on the bottom surface of the sheet 32 as shown in FIG. 4*c*. The outer coating layer 33 can be formed of any suitable electronic insulator, thermal conductor, adhesive material, thermal propagation barrier, fire retarding material or a combination thereof. For example, the outer coating layer 33 is formed of a metal, a ceramic material, carbon, a diamond-like carbon and variants thereof, a diamond powder, a polymer, a rubber, a glass, an adhesive such as a polyolefin, an epoxy, polyvinyl chloride ("PVC"), polylactic acid ("PLA"), polyethylene, a resin, polyacrylic acid, silicone, aerogel, fumed silica or a composite of these materials. A ratio of the thickness of the outer coating layer 33 to the thickness of the sheet 32 ranges from greater than 0.1 to less than 100. The thickness of the coating layer 33 is preferably greater than 5 μm and less than 2 mm.

The sheet 32 includes a plurality of wick structures 34 formed on the top surface of the sheet 32 and spaced apart from each other in the x direction as shown in FIGS. 4*a* and 4*b*. The wick structures 34 are each formed by a wicking material 36. The wick structures 34 can have any suitable form, such as a powder, a sheet, a felt, a mat, a cloth, or a foam. The wick structures 28 each preferably have a width of approximately 25 μm to 4 mm and a thickness of less than 2 mm.

The wicking material 36 can be any suitable material configured to absorb and transport a fluid through capillary force. For example, the wicking material 36 can be a copper alloy, an aluminum alloy, carbon, graphite, a ceramic material, diamond, or any combination thereof. The wicking material 36 is in the form of particles having a spherical shape in this embodiment. However, it should be understood that the wicking material can be formed of a powder or particles having any suitable shape. For example, the powder or particles can be spherical, dendritic, rods, tubes or fibers. The particles of the wicking material 36 are held together by mechanical interlocking, a polymer binder, sintering, interface melting, or a combination of such mechanisms. The particles can be surface modified to improve the capillary forces for the suction of working fluid(s) in the liquid state. The particles have a porosity ranging from 20% to 90% holding the working fluid within the particle. The wick structure has an overall porosity ranging from 20% to 90% in between the particles making up the wick structure where the working fluid is held in condensed state. The porosity can be uniform throughout an entirety of the wick structure 34 or can be a graded porosity that varies along a width of the wick structure 34 in the x direction.

The section 30 also includes a plurality of channels 38 each formed between two adjacent wick structures 34 as shown in FIGS. 4*a* and 4*b*. The channels 38 each have a width of 25 μm to 4 mm. A ratio of the width of each of the wick structures 34 to the width of each of the channels 38 is less than 10.

The section 30 also includes a heat transport media 39 (also termed as working fluid) provided between the wick structures 34. The heat transport media 39 is enclosed within the heat pipe of this embodiment. The heat transport media 39 (working fluid) can be any suitable convective heat transport media existing in liquid-vapor-solid equilibrium inside the heat pipe. For example, the heat transport media 39 includes any compound having the formula $C_aH_bE_c$, where 0≤a≤1, 0≤b≤1, 0≤c≤1, and E is any element or combination of elements. For example, the heat transport media 39 can be a working fluid such as water, a perfluorocarbon, a hydrofluorocarbon, a chlorofluorocarbon, ammonia, ethanol, propanol, butanol, ethylene carbonate, diethylene carbonate, dimethyl carbonate, dioxolane, dimethoxyethane, or a mixture of any of these working fluids.

Figure 5:
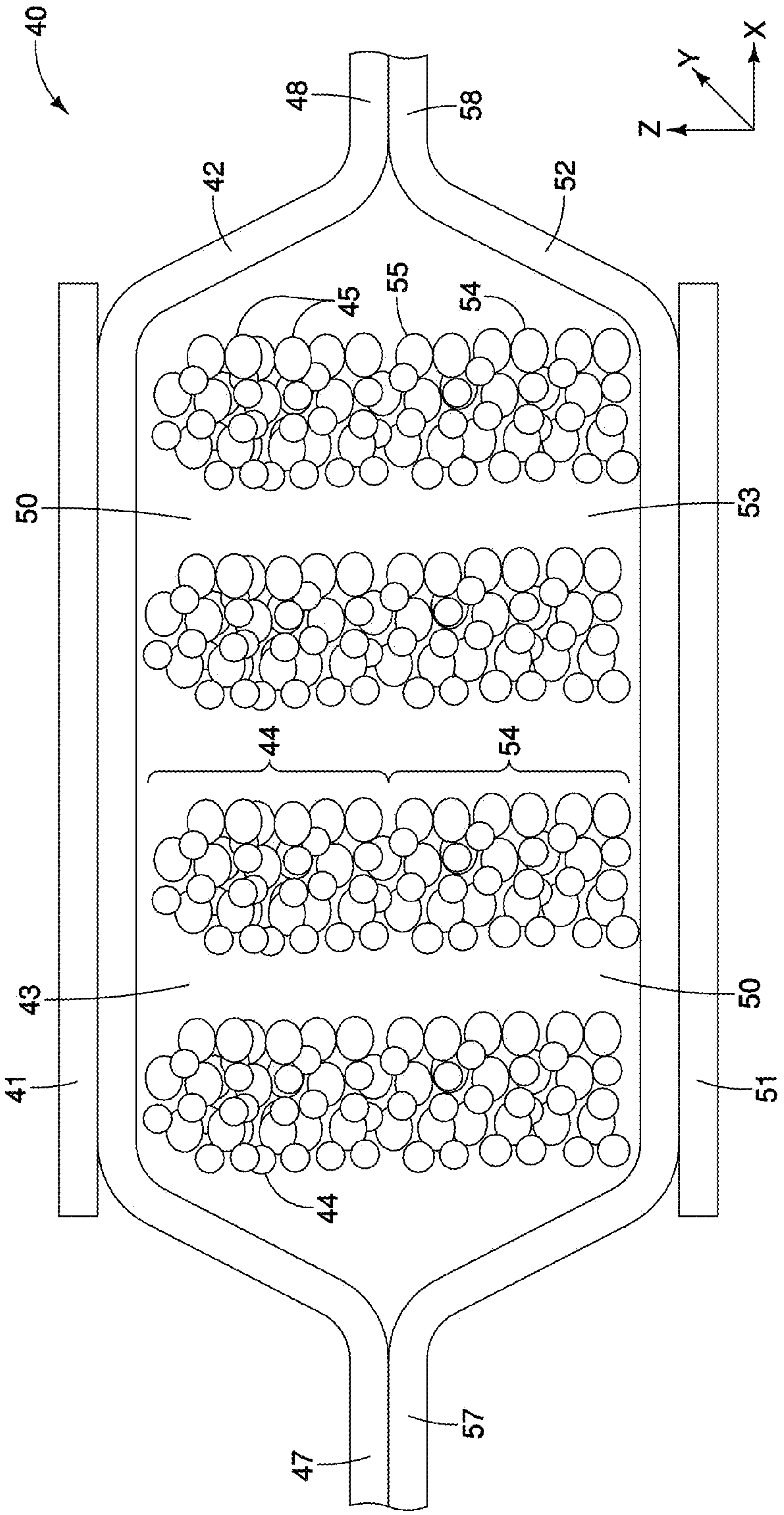
FIG. 5 is a cross-sectional view of a heat pipe according to a fourth embodiment.

FIG. 5 shows a cross-sectional view of a heat pipe 40 according to a fourth embodiment. The heat pipe 40 includes a coating layer 41, a sheet 42, a plurality of channels 43, a plurality of wick structures 44 formed by particles 45, a first end 47 of the sheet 42 and a second end 48 of the sheet 42. The heat pipe 40 also includes a heat transport media 50, a coating layer 51, a sheet 52, a plurality of channels 53, a plurality of wick structures 54 formed by particles 55, a first end 57 of the sheet 52 and a second end 58 of the sheet 52. The first end 47 of the sheet 42 is joined to the first end 57 of the sheet 52 and the second end 48 of the sheet 42 is joined to the second end 58 of the sheet 52 such that the heat pipe 40 is an enclosed structure.

The coating layer 41 is formed on the top surface of the sheet 42 and can be formed of any suitable electronic insulator, thermal conductor, adhesive material, thermal propagation barrier, fire retarding material or a combination thereof. For example, the coating layer 41 is formed of a metal, a ceramic material, carbon, a diamond-like carbon and variants thereof, a diamond powder, a polymer, a rubber, a glass, an adhesive such as a polyolefin, an epoxy, PVC, PLA, polyethylene, a resin, polyacrylic acid, silicone, aerogel, fumed silica or a composite of these materials. A ratio of the thickness of the coating layer 41 to the thickness of the sheet 42 ranges from greater than 0.1 to less than 100. The thickness of the coating layer 41 is greater than 5 μm and less than 2 mm. The heat pipes 40 have a total thickness of less than 3 mm when an outer coating layer thickness is less than 0.5 mm or less than 5 mm when the outer coating layer thickness is greater than 0.5 mm. This outer coating is applicable on either external surfaces of the heat pipe or can be present on only one external surface of the heat pipe. The outer coatings formed on the external surfaces can be dissimilar in composition and dimensions.

The sheet 42 has a thickness of less than 1.5 mm, preferably greater than 5 μm and less than 1 mm. The sheet 42 is formed of at least one metal and/or alloy. For example, the sheet 42 can be formed of copper, aluminum, an alloy of copper or aluminum, a composite material having a thermal conductivity greater than 10 W/K/m, or a combination thereof. The sheet 42 is preferably formed of copper or aluminum.

The channels 43 are each formed between two adjacent wick structures 44. The channels 43 have a width of 25 μm to 4 mm and are configured to hold the heat transport media 50 that is enclosed within the heat pipe 40.

The wick structures 44 are formed on the surface of the sheet 42 that faces the sheet 52. The wick structures 44 are spaced apart from each other in the x direction as shown in FIG. 5. The wick structures 44 can have any suitable form, such as a powder, a sheet, a felt, a mat, a cloth, or a foam. The wick structures 44 each preferably have a width of approximately 25 μm to 4 mm and a thickness of less than 2 mm. A ratio of the width of each of the wick structures 44 to the width of each of the channels 43 is less than 10.

The particles 45 can be formed of any suitable material configured to absorb and transport a fluid through capillary force. For example, the particles 45 are formed of a copper alloy, an aluminum alloy, carbon, graphite, a ceramic material, diamond, or any combination thereof. The particles 45 have a spherical shape in FIG. 5. However, it should be understood that the particles 45 can be dendritic, rods, tubes or fibers. The particles 45 are held together by mechanical interlocking, a polymer binder, sintering, interface melting, or a combination thereof. The particles 45 can be surface modified to improve the capillary forces for the suction of working fluid(s) in the liquid state. The particles 45 have a porosity ranging from 20% to 90% holding the working fluid within the particle. The wick structure has an overall porosity ranging from 20% to 90% in between the particles making up the wick structure where the working fluid is held in condensed state. The porosity can be uniform throughout an entirety of the wick structure 44 or can be a graded porosity that varies along a width of the wick structure 44 in the x direction.

The wick structures 44 can be formed on the sheet 42 in any suitable manner. For example, the particles 45 can be coated on the sheet 42 in any suitable manner to form a desired pattern, i.e., to form the desired spacing between wick structures 44. For example, the particles 45 can be formed on the sheet 42 by slurry coating, deposition, spraying, electrostatic coating, nozzle jet coating, 3D printing techniques, use of dry-wet slurry mixtures or electrodeposition of the particles 45. The coating can be patterned onto the sheet to form the desired spacing between wick structures 44 by machining or the use of masks. The coating can then be sintered with a laser, a selective laser, plasma or in a furnace to form the desired pattern/spacing between wick structures 44.

The heat transport media 50 (also termed as working fluid) is provided between the wick structures 44 and 54. The heat transport media 50 is completely enclosed within the heat pipe 40. The heat transport media 50 (working fluid) can be any suitable convective heat transport media existing in liquid-vapor-solid equilibrium inside the heat pipe. For example, the heat transport media 50 includes any compound having the formula $C_aH_bE_c$, where 0≤a≤1, 0≤b≤1, 0≤c≤1, and E is any element or combination of elements. For example, the heat transport media 50 can be a working fluid such as water, a perfluorocarbon, a hydrofluorocarbon, a chlorofluorocarbon, ammonia, ethanol, propanol, butanol, ethylene carbonate, diethylene carbonate, dimethyl carbonate, dioxolane, dimethoxyethane, or a mixture of any of these working fluids.

The coating layer 51 is formed on the bottom surface of the sheet 52 and can be formed of any suitable electronic insulator, thermal conductor, adhesive material or a combination thereof. For example, as with the coating layer 41, the coating layer 51 is formed of a metal, a ceramic material, carbon, a diamond-like carbon and variants thereof, a diamond powder, a polymer, a rubber, a glass, an adhesive such as a polyolefin, an epoxy, PVC, PLA, polyethylene, a resin, polyacrylic acid, silicone, aerogel, fumed silica or a composite of these materials. A ratio of the thickness of the coating layer 51 to the thickness of the sheet 52 ranges from greater than 0.1 to less than 100. The thickness of the coating layer 51 is greater than 5 μm and less than 2 mm.

The sheet 52 has a thickness of less than 1.5 mm, preferably greater than 5 μm and less than 1 mm. The sheet 52 is formed of at least one metal and/or alloy. For example, the sheet 52 can be formed of copper, aluminum, an alloy of copper or aluminum, a composite material having a thermal conductivity greater than 10 W/K/m, or a combination thereof. The sheet 52 is preferably formed of copper or aluminum.

The channels 53 are each formed between two adjacent wick structures 54. The channels 53 have a width of 25 μm to 4 mm and are configured to hold the heat transport media 50 enclosed within the heat pipe 40.

The wick structures 54 are formed on the surface of the sheet 52 that faces the sheet 42. The wick structures 54 are spaced apart from each other in the x direction as shown in FIG. 5. The wick structures 54 can have any suitable form, such as a powder, a sheet, a felt, a mat, a cloth, or a foam. The wick structures 54 each preferably have a width that is the same as the width of wick structures 44 and is approximately 25 μm to 4 mm. A ratio of the width of each of the wick structures 54 to the width of each of the channels 53 is less than 10. The wick structures 54 have a thickness that is less than 2 mm.

The particles 55 can be formed of any suitable material configured to absorb and transport a fluid through capillary force. For example, the particles 55 are formed of a copper alloy, an aluminum alloy, carbon, graphite, a ceramic material, diamond, or any combination thereof. The particles 55 have a spherical shape in FIG. 5. However, it should be understood that the particles 55 can be dendritic, rods, tubes or fibers. The particles 55 are held together by mechanical interlocking, a polymer binder, sintering, interface melting, or a combination thereof. The particles 55 can be surface modified to improve the capillary forces for the suction of working fluid(s) in the liquid state. The particles 55 have a porosity ranging from 20% to 90% holding the working fluid within the particle. The wick structure has an overall porosity ranging from 20% to 90% in between the particles making up the wick structure where the working fluid is held in condensed state. The porosity can be uniform throughout an entirety of the wick structure 54 or can be a graded porosity that varies along a width of the wick structure 54 in the x direction.

The wick structures 54 can be formed on the sheet 52 in any suitable manner. For example, the wick structures 54 can be formed on the sheet 52 in the same manner that the wick structures 44 are formed on the sheet 42. For example, the particles 55 can be coated on the sheet 52 in any suitable manner to form a desired pattern, i.e., to form the desired spacing between wick structures 54. For example, the particles 55 can be formed on the sheet 52 by slurry coating, deposition, spraying, electrostatic coating, nozzle jet coating, 3D printing techniques, use of dry-wet slurry mixtures or electrodeposition of the particles 55. The coating can be patterned onto the sheet to form the desired spacing between wick structures 54 by machining or the use of masks. The coating can then be sintered with a laser, a selective laser, plasma or in a furnace to form the desired pattern/spacing between wick structures 54.

As shown in FIG. 5, the first end 47 of the sheet 42 is joined to the first end 57 of the sheet 52, and the second end 48 of the sheet 42 is joined to the second end 58 of the sheet 52. The first ends 47, 57 are joined together in any suitable manner. For example, the first ends 47, 57 can be welded or sealed together. Similarly, the second ends 48, 58 can be joined together in any suitable manner, for example by welding or sealing.

FIG. **6*a* shows a partial perspective view of a heat pipe 60 in accordance with a fifth embodiment. The heat pipe 60 has a planar sheet-like form and a total thickness of less than 3 mm. The heat pipe 60 is formed of a first sectional half 62 and a second sectional half 64 that each have a thickness of less than 1.5 mm. Although not particularly limited, the heat pipe 60 can have an area of greater than 250 mm by 150 mm. f The first sectional half 62 and the second sectional half 64 are joined together with their surfaces facing each other to form the heat pipe 60. For example, a bottom surface of the first sectional half 62 faces a top surface of the second sectional half 64. The first sectional half 62 and the second sectional half 64** are sealed together at opposite ends thereof (not shown).

The heat pipe 60 can also include outer coating layers (not shown) formed on an outer surface of the first sectional half 62 and the second sectional half 64. For example, the outer coating layer can be formed on the top surface of the first sectional half 62 and can be formed on the bottom surface of the second sectional half 64. The outer coating layers can be formed of any suitable electronic insulator, thermal conductor, adhesive material or a combination thereof. A ratio of the thickness of each of the outer coating layers to the thickness of the metallic layer ranges from greater than 0.1 to less than 10. For example, the thickness of each coating layer is preferably greater than 5 μm and less than 1 mm.

As shown in FIGS. **6*a* and 6*b*, the first sectional half 62 includes a sheet 63, a plurality of channels 66 spaced apart from each other in the x direction on the surface of the sheet 63, a heat transport media 67, and a plurality of wick structures 68 formed by particles 69**.

The sheet 63 has a thickness of less than 1.5 mm, preferably greater than 5 μm and less than 1 mm. The sheet 63 is formed of at least one metal and/or alloy. For example, the sheet 63 can be formed of copper, aluminum, an alloy of copper or aluminum, a composite material having a thermal conductivity greater than 10 W/K/m, or a combination thereof. The sheet 63 is preferably formed of copper or aluminum.

The channels 66 are each formed between two adjacent wick structures 68. The channels 66 have a width of 25 μm to 4 mm and are configured to hold the heat transport media 67 of the first sectional half 62.

The wick structures 68 are formed on the surface of the sheet 63 that faces the second sectional half 64. The wick structures 68 are spaced apart from each other in the x direction as shown in FIGS. **6*a* and 6*b*. The wick structures 68 can have any suitable form, such as a powder, a sheet, a felt, a mat, a cloth, or a foam. The wick structures 68 each preferably have a width of approximately 25 μm to 4 mm and a thickness of less than 2 mm. A ratio of the width of each of the wick structures 68 to the width of each of the channels 66** is less than 10.

The particles 69 can be formed of any suitable material configured to absorb and transport a fluid through capillary force. For example, the particles 69 are formed of a copper alloy, an aluminum alloy, carbon, graphite, a ceramic material, diamond, or any combination thereof. The particles 69 have a spherical shape as shown in FIG. **6*b*. However, it should be understood that the particles 69 can be dendritic, rods, tubes or fibers. The particles 69 are held together by mechanical interlocking, a polymer binder, sintering, interface melting, or a combination thereof. The particles 69 can be surface modified to improve the capillary forces for the suction of working fluid(s) in the liquid state. The particles 69 have a porosity ranging from 20% to 90% holding the working fluid within the particle. The wick structure has an overall porosity ranging from 20% to 90% in between the particles making up the wick structure where the working fluid is held in condensed state. The porosity can be uniform throughout an entirety of the wick structure 68 or can be a graded porosity that varies along a width of the wick structure 68** in the x direction.

The wick structures 68 can be formed on the sheet 63 in any suitable manner. For example, the particles 69 can be coated on the sheet 63 in any suitable manner to form a desired pattern, i.e., to form the desired spacing between wick structures 68 in the x direction. For example, the particles 69 can be formed on the sheet 63 by slurry coating, deposition, spraying, electrostatic coating, nozzle jet coating, 3D printing techniques, use of dry-wet slurry mixtures or electrodeposition of the particles 69. The coating can be patterned onto the sheet to form the desired spacing between wick structures 68 by machining or the use of masks. The coating can then be sintered with a laser, a selective laser, plasma or in a furnace to form the desired pattern/spacing between wick structures 68 in the x direction.

The heat transport media 67 (also termed as working fluid) is provided between the wick structures 68. The heat transport media 67 is completely enclosed within the heat pipe 60. The heat transport media 67 (working fluid) can be any suitable convective heat transport media existing in liquid-vapor-solid equilibrium inside the heat pipe. For example, the heat transport media 67 includes any compound having the formula $C_aH_bE_c$, where 0≤a≤1, 0≤b≤1, 0≤c≤1, and E is any element or combination of elements. For example, the heat transport media 67 can be a working fluid such as water, a perfluorocarbon, a hydrofluorocarbon, a chlorofluorocarbon, ammonia, ethanol, propanol, butanol, ethylene carbonate, diethylene carbonate, dimethyl carbonate, dioxolane, dimethoxyethane, or a mixture of any of these working fluids.

Figure 6A:
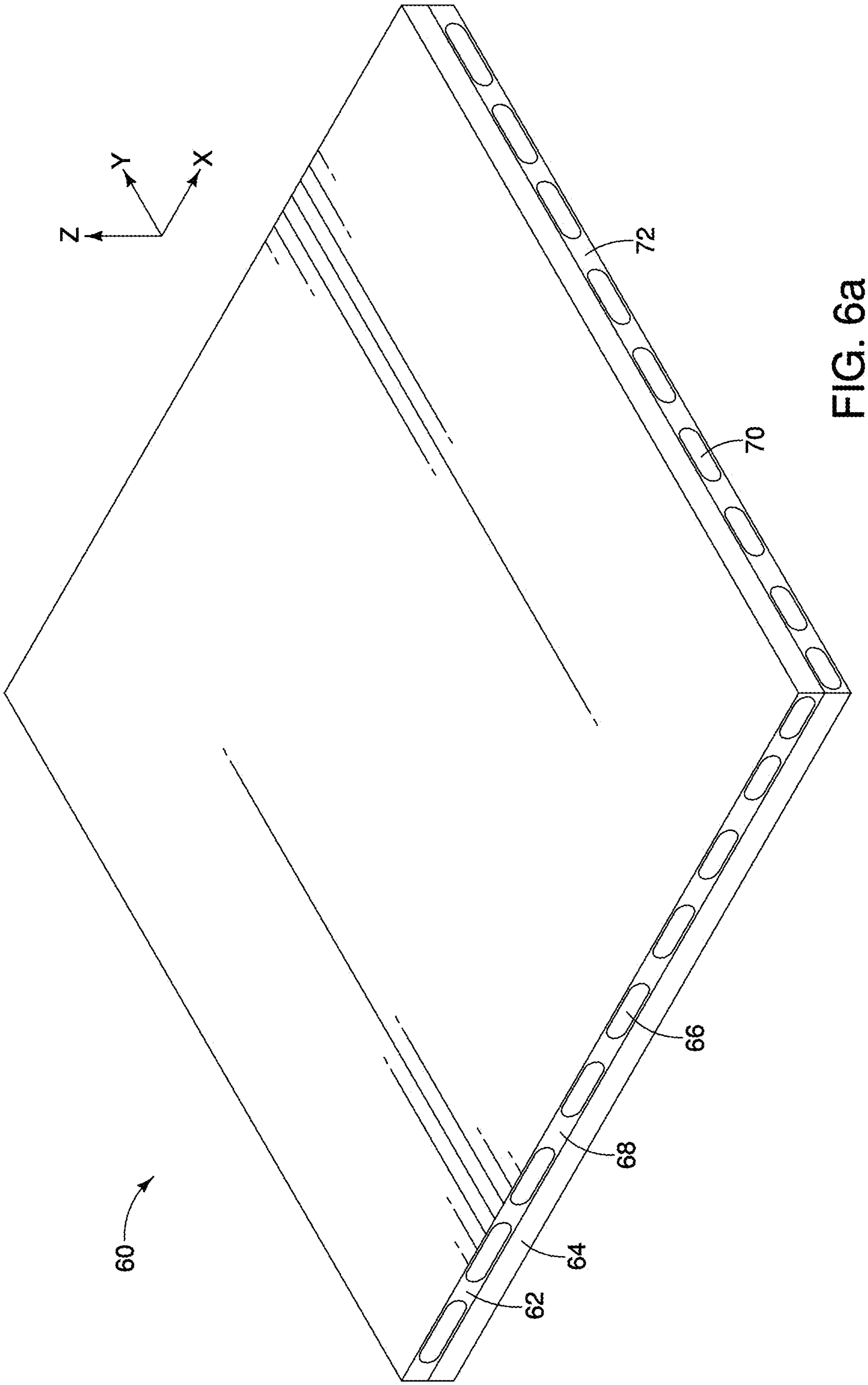
FIG. 6*a* is a partial perspective view of a heat pipe according to a fifth embodiment.
Figure 6B:
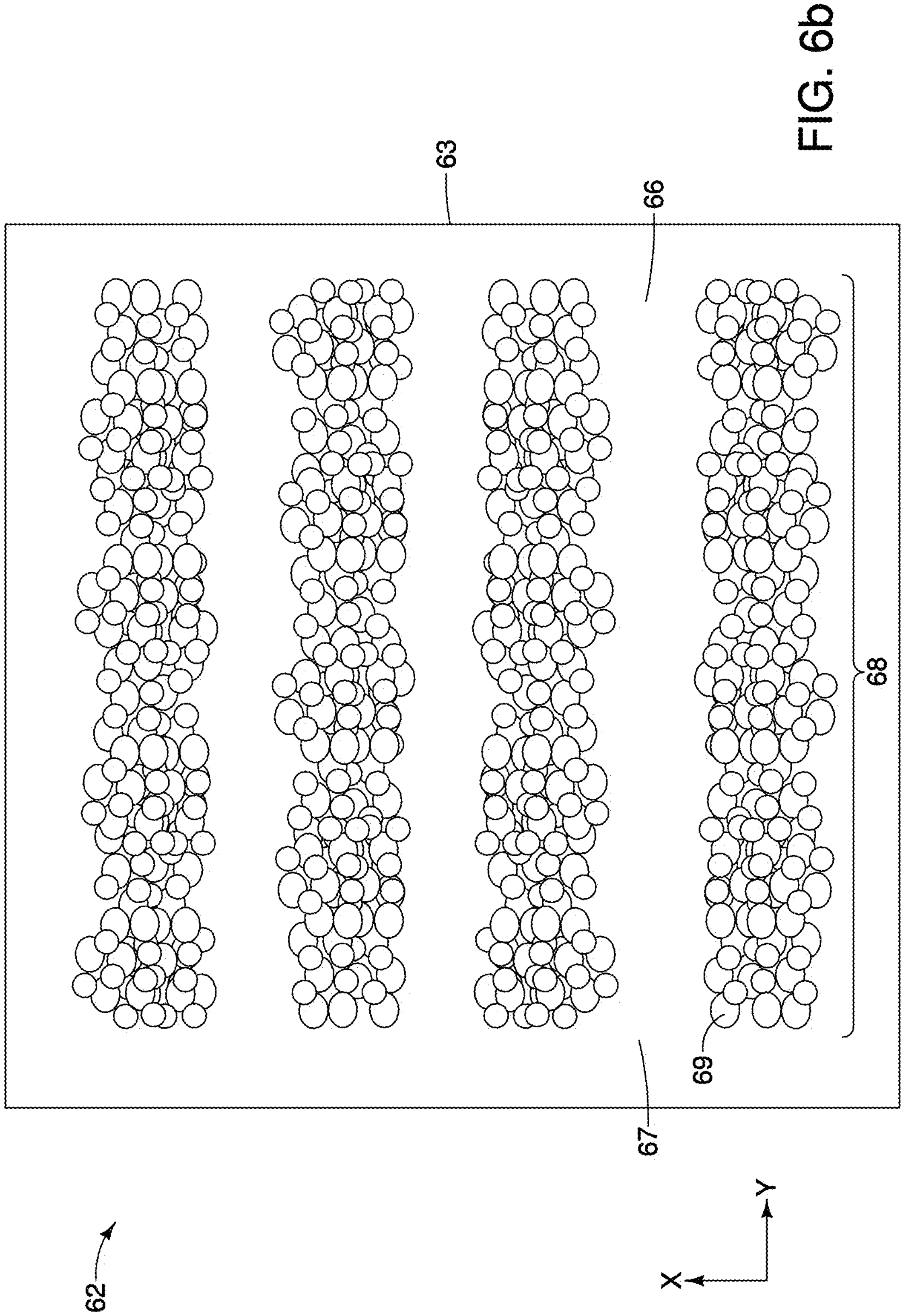
FIG. 6*b* is a bottom view of a section of the heat pipe according to the fifth embodiment.
Figure 6C:
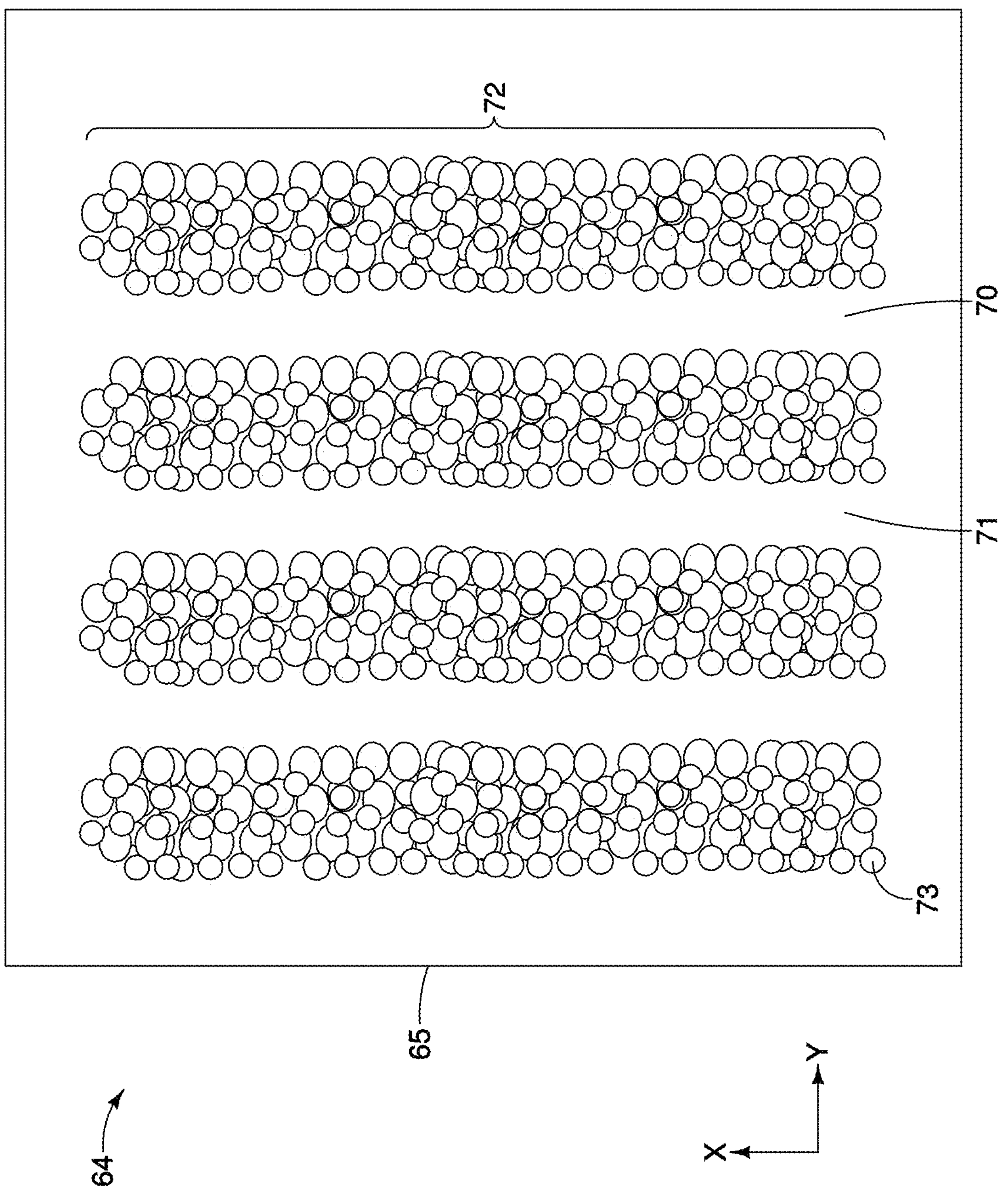
FIG. 6*c* is a top view of another section of the heat pipe according to the fifth embodiment.

FIG. 6*c* shows a top view of the second sectional half 64. As shown in FIGS. 6*a* and 6*c*, the second sectional half 64 includes a sheet 65, a plurality of channels 70 spaced apart from each other in the y direction on the surface of the sheet 65, a heat transport media 71, and a plurality of wick structures 72 formed by particles 73.

The sheet 65 has a thickness of less than 1.5 mm, preferably greater than 5 μm and less than 1 mm. The sheet 65 is formed of at least one metal and/or alloy. For example, the sheet 65 can be formed of copper, aluminum, an alloy of copper or aluminum, a composite material having a thermal conductivity greater than 10 W/K/m, or a combination thereof. The sheet 65 is preferably formed of copper or aluminum.

The channels 70 are each formed between two adjacent wick structures 72. The channels 70 have a width of 25 μm to 4 mm and are configured to hold the heat transport media 71 of the second sectional half 64.

The wick structures 72 are formed on the surface of the sheet 65 that faces the first sectional half 62. The wick structures 72 are spaced apart from each other in the y direction as shown in FIGS. 6*a* and 6*c*. The wick structures 72 can have any suitable form, such as a powder, a sheet, a felt, a mat, a cloth, or a foam. The wick structures 72 each preferably have a width of approximately 25 μm to 4 mm and a thickness of less than 2 mm. A ratio of the width of each of the wick structures 72 to the width of each of the channels 70 is less than 10.

The particles 73 can be formed of any suitable material configured to absorb and transport a fluid through capillary force. For example, the particles 73 are formed of a copper alloy, an aluminum alloy, carbon, graphite, a ceramic material, diamond, or any combination thereof. The particles 73 have a spherical shape. However, it should be understood that the particles 73 can be dendritic, rods, tubes or fibers. The particles 73 are held together by mechanical interlocking, a polymer binder, sintering, interface melting, or a combination thereof. The particles 73 can be surface modified to improve the capillary forces for the suction of working fluid(s) in the liquid state. The particles 73 have a porosity ranging from 20% to 90% holding the working fluid within the particle. The wick structure has an overall porosity ranging from 20% to 90% in between the particles making up the wick structure where the working fluid is held in condensed state. The porosity can be uniform throughout an entirety of the wick structure 72 or can be a graded porosity that varies along a width of the wick structure 72 in the y direction.

The wick structures 72 can be formed on the sheet 65 in any suitable manner. For example, the particles 73 can be coated on the sheet 65 in any suitable manner to form a desired pattern, i.e., to form the desired spacing between wick structures 72 in the x direction. For example, the particles 73 can be formed on the sheet 65 by slurry coating, deposition, spraying, electrostatic coating, nozzle jet coating, 3D printing techniques, use of dry-wet slurry mixtures or electrodeposition of the particles 73. The coating can be patterned onto the sheet to form the desired spacing between wick structures 72 by machining or the use of masks. The coating can then be sintered with a laser, a selective laser, plasma or in a furnace to form the desired pattern/spacing between wick structures 72 in the y direction.

The heat transport media 71 (also termed as working fluid) is provided between the wick structures 72. The heat transport media 71 is completely enclosed within the heat pipe 60. The heat transport media 71 (working fluid) can be any suitable convective heat transport media existing in liquid-vapor-solid equilibrium inside the heat pipe. For example, the heat transport media 71 includes any compound having the formula $C_aH_bE_c$, where 0≤a≤1, 0≤b≤1, 0≤c≤1, and E is any element or combination of elements. For example, the heat transport media 71 can be a working fluid such as water, a perfluorocarbon, a hydrofluorocarbon, a chlorofluorocarbon, ammonia, ethanol, propanol, butanol, ethylene carbonate, diethylene carbonate, dimethyl carbonate, dioxolane, dimethoxyethane, or a mixture of any of these working fluids.

As shown in FIGS. 6*b* and 6*c*, the channels 66 of the first sectional half 62 and the channels 70 of the second sectional half 64 extend along different axes. In other words, the length axis along which the channels 66 extend (i.e., in the y direction) is oriented at an angle of approximately 90° with respect to the length axis along which the channels 70 extend (i.e., in the x direction). In the first embodiment, the channels 26 of the first and second sectional halves 22, 24 extend in the same direction and, thus, the angle of orientation is 0°. However, in this embodiment, the angle of orientation is approximately 90°. However, it should be understood that the angle of orientation in this embodiment can be 80° to 100°.

Figures 6D, 6E:
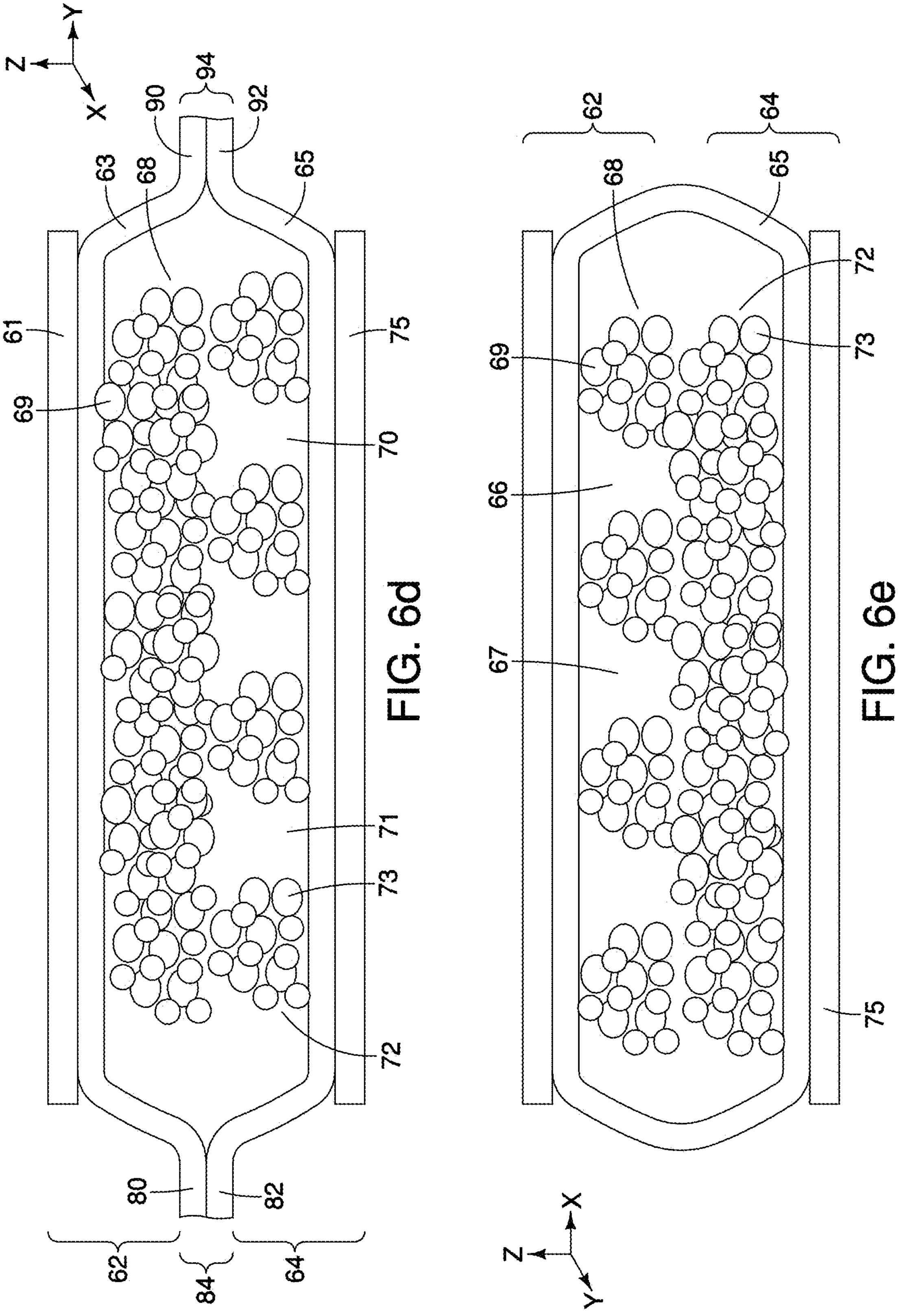
FIG. 6*d* is a cross-sectional view of the heat pipe according to the fifth embodiment.
FIG. 6*e* is another cross-sectional view of the heat pipe according to the fifth embodiment.

FIGS. 6*d* and 6*e* show cross-sectional views of the heat pipe 60. As shown in FIG. 6*d*, the first sectional half 62 of the heat pipe 60 includes a coating layer 61 formed on an outer surface of the sheet 63. The coating layer 61 can be formed of any suitable electronic insulator, thermal conductor, adhesive material or a combination thereof. For example, the coating layer 61 is formed of a metal, a ceramic material, carbon, a diamond-like carbon and variants thereof, a diamond powder, a polymer, a rubber, a glass, an adhesive such as a polyolefin, an epoxy, PVC, PLA, polyethylene, a resin, polyacrylic acid, silicone, or a composite of these materials. A ratio of the thickness of the coating layer 61 to the thickness of the sheet 63 ranges from greater than 0.1 to less than 100. The thickness of the coating layer 61 is greater than 5 μm and less than 2 mm. The heat pipes 60 have a total thickness of less than 3 mm when an outer coating layer thickness is less than 0.5 mm or less than 5 mm when the outer coating layer thickness is greater than 0.5 mm. This outer coating is applicable on either external surfaces of the heat pipe or can be present on only one external surface of the heat pipe. The outer coatings formed on the external surfaces can be dissimilar in composition and dimensions.

The first sectional half 62 also includes a first end 80 of the sheet 63 and a second end 90 of the sheet 63. The first end 80 and the second end 90 are disposed on opposite ends of the sheet 63.

The second sectional half 64 of the heat pipe 60 includes a coating layer 75 formed on an outer surface of the sheet 65. The coating layer 75 can be formed of any suitable electronic insulator, thermal conductor, adhesive material or a combination thereof. For example, the coating layer 75 is formed of a metal, a ceramic material, carbon, a diamond-like carbon and variants thereof, a diamond powder, a polymer, a rubber, a glass, an adhesive such as a polyolefin, an epoxy, PVC, PLA, polyethylene, a resin, polyacrylic acid, silicone, aerogel, fumed silica or a composite of these materials. A ratio of the thickness of the coating layer 75 to the thickness of the sheet 65 ranges from greater than 0.1 to less than 10. The thickness of the coating layer 75 is greater than 5 μm and less than 1 mm.

The second sectional half 64 also includes a first end 84 of the sheet 65 and a second end 94 of the sheet 65. The first end 84 and the second end 94 are disposed on opposite ends of the sheet 65.

As shown in FIG. 6*d*, the first end 80 of the sheet 63 is joined to the first end 84 of the sheet 65, and the second end 90 of the sheet 63 is joined to the second end 94 of the sheet 65. The first ends 80, 90 are joined together in any suitable manner. For example, the first ends 80, 90 can be welded or sealed together. Similarly, the second ends 84, 94 can be joined together in any suitable manner, for example by welding or scaling. By joining together the ends 80, 90 and 84, 94 of the sheets 63, 65, the heat pipe 60 is enclosed.

Figure 7A:
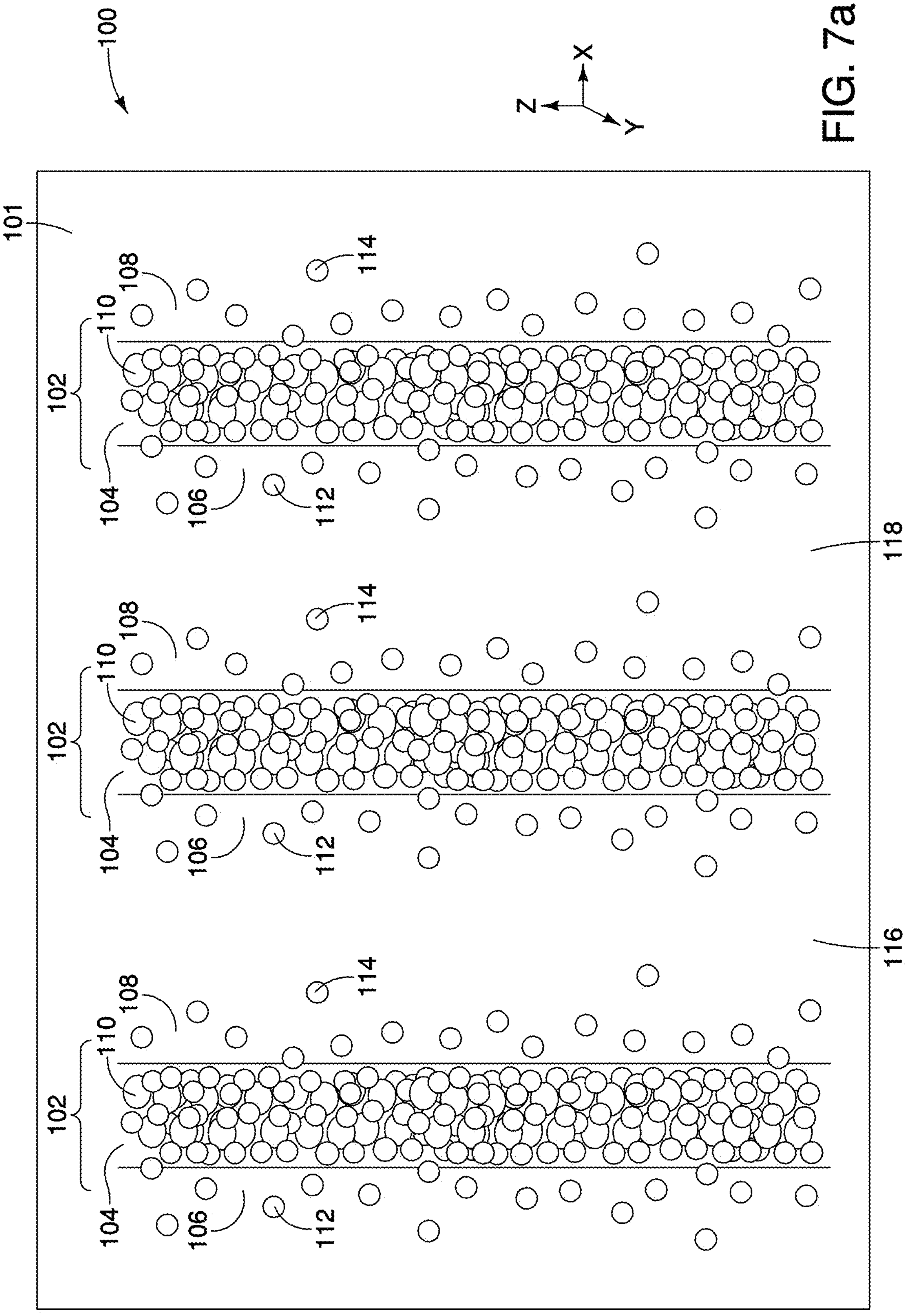
FIG. 7*a* is a top view of a heat pipe according to a sixth embodiment.
Figure 7B:
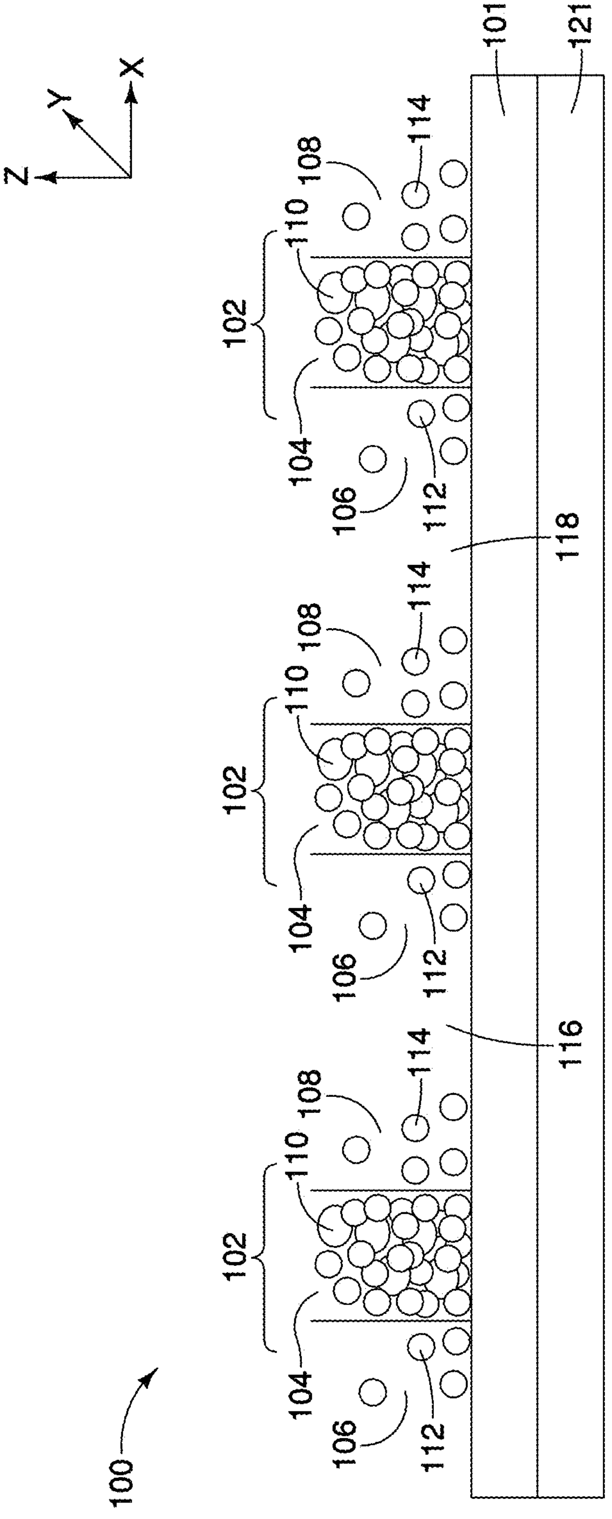
FIG. 7*b* is a sectional view of the heat pipe according to the sixth embodiment.

FIGS. 7*a*-7*b* show various views of one section 100 of a heat pipe according to a sixth embodiment. The section 100 is a sectional half of a heat pipe. The section 100 includes a planar sheet 101. The sheet 101 has a thickness of greater than 5 μm and less than 1 mm. The sheet 101 is formed of at least one metal and/or alloy. For example, the sheet 101 can be formed of copper, aluminum, an alloy of copper or aluminum, or a composite material having a thermal conductivity greater than 10 W/K/m. The sheet 101 is preferably formed of copper or aluminum.

The sheet 101 includes a plurality of wick structures 102 formed on the top surface of the sheet 101 and spaced apart from each other in the x direction as shown in FIGS. 7*a* and 7*b*. The wick structures 102 include a central wick portion 104, a first outer wick portion 106 and a second outer wick portion 108. The central wick portion 104 has a different porosity than the first and second outer wick portions 106, 108. The wick structures 102 can have any suitable form, such as a powder, a sheet, a felt, a mat, a cloth, or a foam. The wick structures 102 each preferably have a width of approximately 25 μm to 4 mm and a thickness of less than 2 mm.

The central wick portion 104 is formed by particles 110. The particles 110 are formed of any suitable material configured to absorb and transport a fluid through capillary force. For example, the particles 110 can be formed of a copper alloy, an aluminum alloy, carbon, graphite, a ceramic material, diamond, or any combination thereof. The particles 110 have a spherical shape in this embodiment. However, it should be understood that the central wick portion 104 can be formed of a powder or particles having any suitable shape. For example, the powder or particles can be spherical, dendritic, rods, tubes or fibers. The particles 110 are held together by mechanical interlocking, a polymer binder, sintering, interface melting, or a combination of such mechanisms. The particles 110 can be surface modified to improve the capillary forces for the suction of working fluid(s) in the liquid state. The particles 110 have a porosity of approximately 0%. In other words, the particles 110 form a solid. In this embodiment, the porosity of the central wick portion 104 is uniform throughout an entirety of the central wick portion 104.

The outer wick portion 106 is formed by particles 112. The particles 112 are formed of any suitable material configured to absorb and transport a fluid through capillary force. For example, the particles 112 can be formed of the same material used to form particles 110.

The particles 112 can be formed of a copper alloy, an aluminum alloy, carbon, graphite, a ceramic material, diamond, or any combination thereof. The particles 112 have a spherical shape in this embodiment. However, it should be understood that the outer wick portion 106 can be formed of a powder or particles having any suitable shape. For example, the powder or particles can be spherical, dendritic, rods, tubes or fibers. The particles 112 are held together by mechanical interlocking, a polymer binder, sintering, interface melting, or a combination of such mechanisms. The particles 112 can be surface modified to improve the capillary forces for the suction of working fluid(s) in the liquid state. The particles 112 have a porosity ranging from 60% to 70% holding the working fluid within the particle. The wick structure has an overall porosity ranging from 20% to 90% in between the particles making up the wick structure where the working fluid is held in condensed state. The porosity of the outer wick portion 106 is uniform throughout an entirety of the outer wick portion 106.

The outer wick portion 108 is formed by particles 114. The particles 114 are formed of any suitable material configured to absorb and transport a fluid through capillary force. For example, the particles 114 can be formed of the same material used to form particles 110 and/or particles 112.

The particles 114 can be formed of a copper alloy, an aluminum alloy, carbon, graphite, a ceramic material, diamond, or any combination thereof. The particles 114 have a spherical shape in this embodiment. However, it should be understood that the outer wick portion 108 can be formed of a powder or particles having any suitable shape. For example, the powder or particles can be spherical, dendritic, rods, tubes or fibers. The particles 114 are held together by mechanical interlocking, a polymer binder, sintering, interface melting, or a combination of such mechanisms. The particles 114 can be surface modified to improve the capillary forces for the suction of working fluid(s) in the liquid state. The particles 114 have a porosity of approximately 60% to 70% within which the working fluid is held in condensed state. The wick structure 68 has an overall porosity ranging from 20% to 90% in between the particles 114 making up the wick structure 108 where the working fluid 71 is held in condensed state. The porosity of the outer wick portion 108 is uniform throughout an entirety of the outer wick portion 108.

The section 101 also includes a plurality of channels 116 each formed between two adjacent wick structures 102. The channels 116 each have a width of 25 μm to 4 mm. A ratio of the width of each of the wick structures 102 to the width of each of the channels 116 is less than 10.

The section 101 also includes a heat transport media 118 (also termed working fluid) provided between the wick structures 102. The heat transport media 118 is enclosed within the heat pipe of this embodiment. The heat transport media 118 (working fluid) can be any suitable convective heat transport media existing in liquid-vapor-solid equilibrium inside the heat pipe. For example, the heat transport media 118 includes any compound having the formula $C_aH_bE_c$, where $0 \le a \le 1$, $0 \le b \le 1$, $0 \le c \le 1$, and E is any element or combination of elements. For example, the heat transport media 118 can be a working fluid such as water, a perfluorocarbon, a hydrofluorocarbon, a chlorofluorocarbon, ammonia, ethanol, propanol, butanol, ethylene carbonate, diethylene carbonate, dimethyl carbonate, dioxolane, dimethoxyethane, or a mixture of any of these working fluids.

The section 100 also includes an outer coating layer 121 formed on the bottom surface of the sheet 101 as shown in FIG. 4*b*. The outer coating layer 121 can be formed of any suitable electronic insulator, thermal conductor, adhesive material or a combination thereof. For example, the outer coating layer 121 is formed of a metal, a ceramic material, carbon, a diamond-like carbon and variants thereof, a diamond powder, a polymer, a rubber, a glass, an adhesive such as a polyolefin, an epoxy, PVC, PLA, polyethylene, a resin, polyacrylic acid, silicone, aerogel, fumed silica or a composite of these materials. A ratio of the thickness of the outer coating layer 121 to the thickness of the sheet 101 ranges from greater than 0.1 to less than 10. The thickness of the coating layer 121 is preferably greater than 5 μm and less than 1 mm.

FIG. 8*a* shows a partial enlarged view of a battery pack 130 according to a seventh embodiment. As shown in FIG. 8*a*, the battery pack 130 includes a cell module 132. The cell module 132 includes a plurality of unit cells 134 and heat pipes 135 provided between the unit cells 134. The unit cells 134 are any suitable batteries. For example, the unit cells 134 are each lithium-ion batteries. The heat pipes 135 have a total thickness of less than 3 mm when an outer coating layer thickness is less than 0.5 mm or less than 5 mm when the outer coating layer thickness is greater than 0.5 mm. Although not shown, the heat pipes 135 have a larger area than the unit cells 134 such that an entirety of each of the unit cells 134 is in contact with at least one of the heat pipes 135. In this regard, the heat pipes 135 can efficiently absorb heat generated by the unit cells 134 during charging of the battery pack 130. For example, the heat pipes 135 can have an area of greater than 250 mm by 150 mm.

The heat pipes 135 have a planar sheet-like form as shown in FIGS. 8*a* and 8*b*. The heat pipes 135 can be formed of any suitable material. For example, the heat pipes 135 can be formed of two metallic layers each including at least one metal and/or alloy. Each of the metallic layers is preferably formed of copper, aluminum, an alloy of copper or aluminum, and combinations thereof. The two metallic layers are sealed or joined together at opposite ends thereof to form an enclosed structure. Although not shown, the heat pipes 135 internally, between the metallic layers, include a plurality of wick structures and channels formed between each of the wick structures as described in detail above. The heat pipes 135 also include a heat transport media enclosed within the sealed ends of the two metallic layers.

The heat pipes 135 can also include outer coating layers (not shown) formed on each of the metallic layers and in contact with the unit cells 134. The outer coating layers can be formed of any suitable electronic insulator, thermal conductor, adhesive material, thermal propagation barrier, fire retarding material or a combination thereof. A ratio of the thickness of each of the outer coating layers to the thickness of each of the metallic layers ranges from greater than 0.1 to less than 100. For example, the thickness of each of the outer coating layers is preferably greater than 5 μm and less than 2 mm. The heat pipes 135 have a total thickness of less than 3 mm when an outer coating layer thickness is less than 0.5 mm or less than 5 mm when the outer coating layer thickness is greater than 0.5 mm. This outer coating is applicable on either external surfaces of the heat pipe or can be present on only one external surface of the heat pipe. The outer coatings formed on the external surfaces can be dissimilar in composition and dimensions.

The cell module 132 further includes an outer edge portion 136 in which two cooling pipes 137 are provided. The outer edge portion 136 is a cooling portion that includes the cooling pipes 137, heat pipes 135, and vertical cooling fins 139. The cooling pipes 137 pass through portions of the cooling fins 139 as shown in FIG. 8*a*. The cooling pipes 137 are formed of any suitable material configured to allow liquid coolant, such as water or ethylene glycol, to pass therethrough to cool the battery pack 130 and/or the cell module 132. For example, the cooling pipes 137 can be formed of copper alloys, aluminum alloys, iron based alloys such as steel with high thermal conductivity.

FIG. 8*b* shows a partial cross-sectional view of the battery pack 130 according to a seventh embodiment. As shown in FIG. 8*b*, the plurality of heat pipes 135 includes heat pipes 135*a*, 135*b*, 135*c*, 135*d*, 135*e*, 135*f*, 135*g*, 135*h* and 135*i* each provided between unit cells 134. The ends of heat pipes 135*a*, 135*b*, 135*c*, 135*d*, 135*e*, 135*f*, 135*g*, 135*h* and 135*i* are stacked together in direct contact and secured in contact with each other by clamp 142. The vertical cooling fins 139 extend in the vertical direction above and below the clamp 142. The vertical cooling fins 139 can be created with standard heat exchange assembly techniques. The clamp 142 can be formed of any suitable material, such as a metal.

The battery pack 130 further includes a pair of flanges 144 and a container 146 that creates a temperature regulated fluid circulation region therewithin. For example, as shown in FIG. 8*a*, the cooling pipes 137 are configured to provide cooling fluid to container 146, and the container 146 is configured to create a region for circulating the liquid coolant from cooling pipes 137 around the stacked portion of heat pipes 135. The flanges 144 are formed of any suitable material that can prevent coolant from leaking through container 146 into the portion of the cell module 132 where the unit cells 134 are located. The container 146 is formed of any suitable material for containing the liquid coolant from the cooling pipes 137. As shown in FIG. 8*b*, the container 146 includes not only entry points for cooling pipes 137 but also an entry point for the stacked portions of heat pipes 135.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A heat pipe for a battery pack, the heat pipe comprising:
a first sheet formed of a first metal;
a plurality of first wick structures formed on a first surface of the first sheet, the plurality of first wick structures being separate and spaced apart from each other in a first direction along the first surface of the first sheet and each of the plurality of the first wick structures having a same width in the first direction;
a plurality of first channels formed between two of the plurality of first wick structures;
a second sheet formed of a second metal, a second surface of the second sheet facing the first surface of the first sheet;
a heat transport media formed within each of the plurality of first channels,
each of the plurality of first wick structures being formed of a first wicking material configured to absorb and transport a fluid through capillary force, and
the first sheet and the second sheet being joined together at opposite ends such that the heat transport media is enclosed within the first sheet and the second sheet.

2. The heat pipe according to claim 1, wherein
the first metal and second metal are selected from the group consisting of: copper, aluminum, and mixtures thereof.

3. The heat pipe according to claim 1, wherein
the first wicking material comprises at least one selected from the group consisting of: carbon, graphite, copper, aluminum, a ceramic material, and diamond.

4. The heat pipe according to claim 3, wherein heat absorbed in an area of the heat pipe closest to an electrode tab heats a heat transport media at a first end of the heat pipe forming a vapor that is then condensed into a liquid as the heat leaves a second end of the heat pipe.

5. The heat pipe according to claim 1, wherein
each of the plurality of first channels has a width of less than 4 mm.

6. The heat pipe according to claim 1, wherein:
the second sheet includes a plurality of second wick structures formed on the second surface of the second sheet and a plurality of second channels each formed between two of the plurality of second wick structures, and
each of the plurality of second wick structures is formed of a second wicking material configured to absorb and transport a fluid through capillary force.

7. The heat pipe according to claim 6, wherein
a first length axis along which the first channels extend is oriented at an angle of 0° to 90° with respect to a second length axis along which the second channels extend.

8. The heat pipe according to claim 6, wherein each of the plurality of first wick structures is in contact with one of the plurality of second wick structures.

9. The heat pipe according to claim 1, wherein
the plurality of first wick structures each include a central portion that is solid and first and second outer portions on opposite sides of the central portion, each of the first outer portion and the second outer portion having a porosity of approximately 20% to 90%.

10. The heat pipe according to claim 1, wherein
each of the plurality of first wick structures has a width of 25 μm to 4 mm.

11. A battery pack comprising:
a plurality of unit cells stacked in a stacking direction of the battery pack; and
a heat pipe formed between a first unit cell and a second unit cell of the plurality of unit cells, the heat pipe comprising:
a first sheet formed of a first metal;
a plurality of first wick structures formed on a first surface of the first sheet, the plurality of first wick structures being separate and spaced apart from each other in a first direction along the first surface of the first sheet and each of the plurality of the first wick structures having a same width in the first direction;
a plurality of first channels formed between two of the plurality of first wick structures;
a second sheet formed of a second metal, a second surface of the second sheet facing the first surface of the first sheet;
and
a heat transport media formed within each of the plurality of first channels,
each of the plurality of first wick structures being formed of a first wicking material configured to absorb and transport a fluid through capillary force,
the first sheet and the second sheet being joined together at opposite ends such that the heat transport media is enclosed within the first sheet and the second sheet.

12. The battery pack according to claim 11, further comprising:
a coating layer disposed on a third surface of the first sheet and a fourth surface of the second sheet,
the third surface being opposite the first surface of the first sheet and the fourth surface being opposite the second surface of the second sheet,
the third surface being in contact with the first unit cell and the fourth surface being in contact with the second unit cell, and
the coating layer formed of a material selected from the group consisting of: an electronic insulator, a thermal conductor, an adhesive, and mixtures thereof.

13. The battery pack according to claim 11, wherein the first metal is selected from the group consisting of: copper, aluminum, and mixtures thereof.

14. The battery pack according to claim 11, wherein the first wicking material comprises at least one selected from the group consisting of: carbon, graphite, copper, aluminum, a ceramic material, and diamond.

15. The battery pack according to claim 11, wherein the second sheet includes a plurality of second wick structures formed on the second surface and a plurality of second channels each formed between two of the plurality of second wick structures, and each of the plurality of second wick structures is formed of a second wicking material configured to absorb and transport a fluid through capillary force.

16. The battery pack according to claim 15, wherein a first length axis along which the first channels extend is oriented at an angle of approximately 90° with respect to a second length axis along which the second channels extend.

17. The battery pack according to claim 11, wherein each of the opposite ends of the first sheet and the second sheet form cooling fins in the battery pack.

18. The battery pack according to claim 17, wherein the cooling fins are disposed in an outer side of the battery pack such that the cooling fins are not disposed between the first unit cell and the second unit cell.

19. The battery pack according to claim 18, further comprising at least one cooling pipe disposed in the outer side of the battery pack and protruding through at least one of the cooling fins.

20. The battery pack according to claim 11, wherein the plurality of first wick structures each include a porous portion having a porosity of approximately 60% to 70%.

* * * * *